US012654839B2

(12) United States Patent
Maldonado et al.

(10) Patent No.: US 12,654,839 B2
(45) Date of Patent: Jun. 16, 2026

(54) RECONFIGURABLE UNMANNED VEHICLES

(71) Applicant: Texas Tech University System, Lubbock, TX (US)

(72) Inventors: Victor Maldonado, Lubbock, TX (US); Yao Ma, Lubbock, TX (US); Donald Docimo, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 0 days.

(21) Appl. No.: 18/258,515

(22) PCT Filed: Dec. 21, 2021

(86) PCT No.: PCT/US2021/064575
§ 371 (c)(1),
(2) Date: Jun. 20, 2023

(87) PCT Pub. No.: WO2022/140362
PCT Pub. Date: Jun. 30, 2022

(65) Prior Publication Data
US 2024/0043144 A1    Feb. 8, 2024

Related U.S. Application Data

(60) Provisional application No. 63/128,750, filed on Dec. 21, 2020.

(51) Int. Cl.
*B64U 20/40*    (2023.01)
*B60F 5/02*    (2006.01)
(Continued)

(52) U.S. Cl.
CPC .................. *B64C 5/02* (2013.01); *B60F 5/02* (2013.01); *B60L 50/60* (2019.02); *B64C 5/06* (2013.01);
(Continued)

(58) Field of Classification Search
CPC ........ B64U 20/40; B64U 30/12; B64U 30/14; B64U 30/40; B64C 2039/10
See application file for complete search history.

(56) References Cited

U.S. PATENT DOCUMENTS

| | | | |
|---|---|---|---|
| 4,736,910 A | 4/1988 | O'Quinn et al. | |
| 9,505,484 B1 | 11/2016 | Al-Sabah | |

(Continued)

FOREIGN PATENT DOCUMENTS

WO      WO-2019245407 A1 *   12/2019   ............. B64U 30/12

OTHER PUBLICATIONS

University of Illinois Urbana-Champaigne, UIUC Airfoil Coordinates Database, [web.archive.org/web/20170516080519/https:m-selig.ae.illinois.edu/ads/coord_database.html], accessible on May 16, 2017 (Year: 2017).*
PCT/US2021/064575. International Search Report & Written Opinion (Mar. 11, 2022).

*Primary Examiner* — Timothy D Collins
*Assistant Examiner* — Justin Michael Heston
(74) *Attorney, Agent, or Firm* — LOZA & LOZA, LLP; Kevin L. Soules

(57)    ABSTRACT

The disclosed embodiments are directed to a modular autonomous vehicle system comprising a blended wing body module, at least two high speed long range wing panel modules configured to interchangeably mount to the blended wing body module, at least two low speed high endurance wing panel modules configured to interchangeably mount to the blended wing body module, a vertical tails module configured to interchangeably mount to the blended wing body module, a vertical takeoff and landing fin module configured to interchangeably mount to the blended wing body module, a power train, and a wheels module with a plurality of wheels operably connected to the power train.

9 Claims, 17 Drawing Sheets

(51) Int. Cl.

| | |
|---|---|
| *B60L 50/60* | (2019.01) |
| *B64C 5/02* | (2006.01) |
| *B64C 5/06* | (2006.01) |
| *B64C 39/10* | (2006.01) |
| *B64U 10/70* | (2023.01) |
| *B64U 30/14* | (2023.01) |
| *B64U 50/19* | (2023.01) |
| *B64D 35/021* | (2024.01) |

(52) U.S. Cl.
CPC ............. *B64U 10/70* (2023.01); *B64U 20/40* (2023.01); *B64U 30/14* (2023.01); *B64U 50/19* (2023.01); *B60L 2200/10* (2013.01); *B64C 2039/105* (2013.01); *B64D 35/021* (2024.01); *B64U 2201/10* (2023.01)

(56)  References Cited

U.S. PATENT DOCUMENTS

| | | | | |
|---|---|---|---|---|
| 2002/0145075 A1* | 10/2002 | Page | ...................... | B64U 10/20 |
| | | | | 244/36 |
| 2014/0231593 A1* | 8/2014 | Karem | .................. | B64C 1/0009 |
| | | | | 244/45 R |
| 2017/0113778 A1* | 4/2017 | Liu | ........................ | B64U 10/25 |
| 2018/0244377 A1 | 8/2018 | Chan | | |
| 2019/0031339 A1* | 1/2019 | McCullough | ........... | B64C 39/04 |
| 2019/0135424 A1* | 5/2019 | Baity | .................. | B64C 29/0033 |
| 2021/0053694 A1* | 2/2021 | Winkelstein | ........ | B64C 29/0025 |

* cited by examiner

Wide-mission Performance

| Mission Type | Performance | Range, km | Cruise Mach, $M$ | VTOL | Payload |
|---|---|---|---|---|---|
| Law Enforcement | LSHE | 200 | 0.06 | No | Camera, 0.3kg |
| Air Delivery | HSLR-VTOL | 100 | 0.1 | Yes | Package, 0.5kg |
| Oil and Gas Inspection | LSHE-VTOL | 37 | 0.06 | Yes, 30 min hover | Camera, 0.3kg |

900

Wing airfoil characteristics

| UAV variant | Location | Airfoil | Thickness, $\%c$ | Camber, $\%c$ | $C_{D_o}$ | max. $L/D$ |
|---|---|---|---|---|---|---|
| LSHE and LSHE-VTOL | Root | Eppler 171 | 12.28 | 0 | 0.008 | 66 |
| LSHE and LSHE-VTOL | Tip | Eppler 330 | 11 | 2.1 | 0.01 | 86 |
| HSLR and HSLR-VTOL | Root | Eppler 171 | 12.28 | 0 | 0.008 | 66 |
| HSLR and HSLR-VTOL | Tip | Eppler 182 | 8.5 | 1.2 | 0.007 | 82 |

950

Wing characteristics

| UAV variant | Wing area, $S$ [m$^2$] | Aspect ratio, $A$ | Span, $b$ [m] | leading edge sweep, $\Lambda$ | taper ratio, $\lambda$ |
|---|---|---|---|---|---|
| LSHE | 0.34 | 9 | 2.15 | $7.8^o$ | 0.53 |
| HSLR | 0.218 | 5.87 | 1.55 | $24^o$ | 0.515 |
| LSHE-VTOL | 0.34 | 9 | 2.15 | $7.8^o$ | 0.53 |
| HSLR-VTOL | 0.218 | 5.87 | 1.55 | $24^o$ | 0.515 |

Vertical tail and VTOL fin airfoil characteristics

| Component | Location | Airfoil | Thickness, $\%c$ | Camber, $\%c$ | $C_{D_o}$ | max. $L/D$ |
|---|---|---|---|---|---|---|
| Vertical tail | R/T | NACA 0006 | 6 | 0 | 0.007 | 39 |
| VTOL fin | R/T | NACA 0010 | 10 | 0 | 0.01 | 44 |

1050

Vertical tail and VTOL fin design characteristics

| Component | Planform area, $S$ [m$^2$] | Aspect ratio, $A$ | Span, $b$ [m] | leading edge sweep, $\Lambda$ | taper ratio, $\lambda$ |
|---|---|---|---|---|---|
| Vertical tail | 0.0249 | 1.5 | 0.193 | $60^o$ | 0.45 |
| VTOL fin | 0.0265 | 1.56 | 0.203 | $38^o$ | 0.71 |

Static loads and moment distribution

| Load | Magnitude, [kg] | $x_{in.}$, [cm] | $x_{end}$, [cm] | resultant, [cm] | Moment, [cm-kg] |
|---|---|---|---|---|---|
| BWB structure | 0.54 | 0 | 51.8 | 17.78 | -5.73 |
| Wing structure | 1.1 | 16.51 | 41.91 | 27.94 | -0.37 |
| 2 Wing nacelles with motor | 0.49 | 14 | 25.4 | 17.78 | -5.14 |
| 2 VTOL fins with motor | 0.59 | 30.48 | 45.72 | 35.56 | 5.04 |
| LiPo Battery, 4S 10 Ah | 1 | 20.32 | 37.1 | 28.7 | 0.44 |
| Avionics, comm. | 0.16 | 11.43 | 17.78 | 14.61 | -2.18 |
| Payload, camera | 0.3 | 2.54 | 10.16 | 6.35 | -6.58 |
| Sum | 4.18 | | | | -15.26 |

Propulsion system mission phase power calculations

| Mission phase | $T/W_{TO}$ | $\Pi\eta$ | $P_{elec}$ | $E_{phase}$ |
|---|---|---|---|---|
| VTOL climb | 1.3 | 0.44 | $\dfrac{T^{3/2}}{\sqrt{2\rho A}}\dfrac{1}{\Pi\eta}$ | $P_{elec}t_{climb}$ |
| Hover | 1 | 0.44 | $\dfrac{T^{3/2}}{\sqrt{2\rho A}}\dfrac{1}{\Pi\eta}$ | $P_{elec}t_{hover}$ |
| Forward Flight | N/A | 0.44 | $\dfrac{P_{FF}}{\Pi\eta}$ | $P_{elec}t_{FF}$ |
| VTOL descent | 0.9 | 0.44 | $\dfrac{T^{3/2}}{\sqrt{2\rho A}}\dfrac{1}{\Pi\eta}$ | $P_{elec}t_{descent}$ |

Mission phase energy and battery mass

| Mission | VTOL c., E | Hover, E | FW, E | VTOL d., E | Mission, E [Wh] | $M_{batt}, [kg]$ |
|---|---|---|---|---|---|---|
| Law Enforcement | N/A | N/A | 190.44 | N/A | 190.44 | 1.57 |
| Air Delivery | 5.28 | N/A | 152.34 | 3.70 | 161.32 | 1.31 |
| Oil and Gas Inspection | 3.88 | 45.21 | 32.80 | 3.04 | 84.93 | 0.60 |

1400

Figure 15:
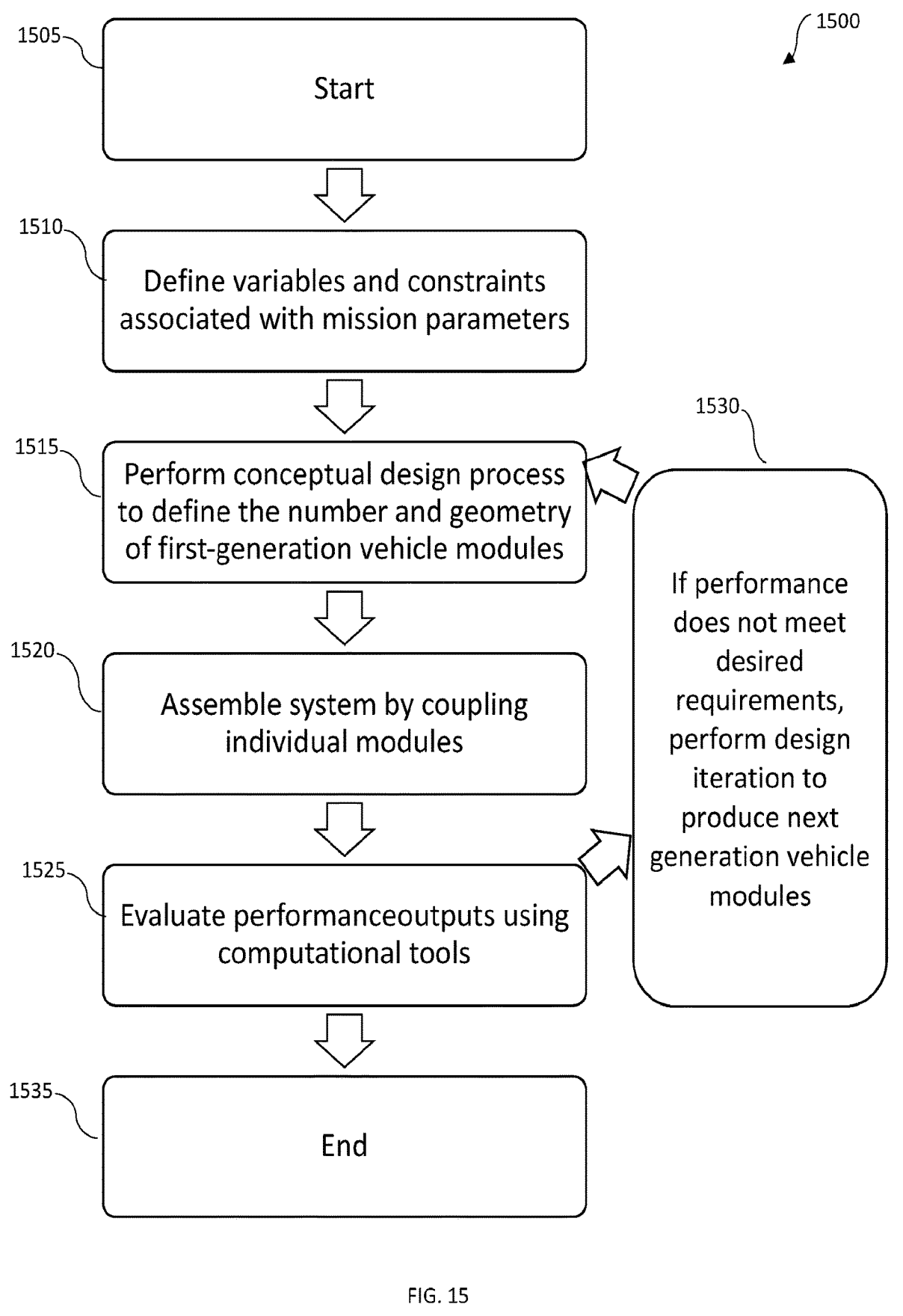

1500

1505

Start

1510

Define variables and constraints associated with mission parameters

1515

Perform conceptual design process to define the number and geometry of first-generation vehicle modules

1520

Assemble system by coupling individual modules

1525

Evaluate performanceoutputs using computational tools

1530

If performance does not meet desired requirements, perform design iteration to produce next generation vehicle modules

1535

End

Wing airfoil characteristics

| Wing Location | Airfoil | Thickness, %c | Camber, %c | $C_{D_o}$ | max. $L/D$ |
|---|---|---|---|---|---|
| Root | Eppler 171 | 12.28 | 0 | 0.008 | 66 |
| Tip | Eppler 182 | 8.5 | 1.2 | 0.007 | 82 |

1900

UGAV dynamical performance

2000

Results of battery state of charge change and total energy consumed

| Number of battery packs | Battery SOC change, % | Total energy consumed, $J$ |
|:---:|:---:|:---:|
| 1 | 5 | 7299 |
| 3 | 1.69 | 7452 |
| 5 | 1.03 | 7601 |
| 7 | 0.75 | 7758 |
| 10 | 0.54 | 7986 |

Controller performance with different    gains.

RECONFIGURABLE UNMANNED VEHICLES

CROSS REFERENCE TO RELATED PATENT APPLICATIONS

This application claims the priority and benefit under 35 U.S.C. § 119(e) of U.S. Provisional Patent Application Ser. No. 63/128,750 filed Dec. 21, 2020, entitled "RECONFIGURABLE UNMANNED VEHICLES." U.S. Provisional Patent Application Ser. No. 63/128,750 is herein incorporated by reference in its entirety.

TECHNICAL FIELD

Embodiments are generally related to unmanned aerial vehicles (UAVs) or hybrid unmanned ground-aerial vehicles (UGAVs). Embodiments are further related to modular components associated with UAVs and UGAVs. Embodiments are further related to modular components for unmanned vehicles that can be used as terrestrial vehicles and as aerial vehicles. Embodiments are further related to design framework that combines modular reconfiguration of an unmanned aerial vehicle with automated logic between airframe modules and autopilot such that optimal flight performance is achieved between multiple variants or configurations of the vehicle.

BACKGROUND

Unmanned vehicle systems are becoming increasingly prevalent, and are likely to be ubiquitous in the near future. Unmanned vehicular systems are generally designed to serve a specific purpose. For example, certain unmanned aerial vehicles are designed to provide high speed performance, at the expense of fuel efficiency. Likewise, other vehicles may be configured for improved speed and range, while others are designed for low speed and high endurance.

Prior art approaches to address these limitations involve the use of certain specialized components. Such specialization tends to be incremental or sacrifices performance in other mission critical areas. For example, some single-variant hybrid UAVs can accomplish both vertical takeoff and landing (VTOL), as well as forward-flight as a fixed-wing multicopter vehicle. However, these prior art approaches have undesirable drag and power penalties because they require separate propulsion units for VTOL and forward flight.

The need for improved autonomous vehicles is being driven by emerging commercial and military mission parameters which require unmanned vehicles with the ability to accomplish ground and aerial functions. This requires collaboration and cross-disciplinary design approaches between unmanned ground vehicles (UGVs) and unmanned aerial vehicles (UAVs). This type of hybrid vehicle is commonly referred to as an unmanned ground-aerial vehicle (UGAV).

Current approaches to UGAVs take two common forms: rotorcraft or fixed-wing. Combining the design and functions of a ground vehicle with those of rotorcraft or fixed-wing vehicle is challenging because of competing design drivers required to maximize performance for each respective vehicle.

As such, there is a need in the art for improved modular unmanned aerial vehicles and improved modular unmanned ground-aerial vehicles as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide an unmanned vehicle.

It is another aspect of the disclosed embodiments to provide systems and apparatuses for unmanned terrestrial and aerial vehicles.

It is another aspect of the disclosed embodiments to provide methods and systems for modular unmanned vehicles.

It is another aspect of the disclosed embodiments to provide methods, systems, and apparatuses for modular components associated with unmanned terrestrial and aerial vehicles.

It is another aspect of the disclosed embodiments to provide a reconfigurable logic design framework for unmanned vehicles.

It will be appreciated that the methods and systems can be achieved according to the embodiments disclosed herein. For example, in an embodiment a modular UAV system comprises a blended wing body module, at least two high speed long range wing panel modules configured to interchangeably mount to the blended wing body module, at least two low speed high endurance wing panel modules configured to interchangeably mount to the blended wing body module, a vertical tails module configured to interchangeably mount to the blended wing body module, and a vertical takeoff and landing fin module configured to interchangeably mount to the blended wing body module.

In an embodiment the UAV system further comprises at least one wing nacelle configured on each of the at least two high speed long range wing panel modules and a motor configured in each wing nacelle. In an embodiment the UAV system further comprises at least one wing nacelle configured on each of the at least two low speed high endurance wing panel modules and a motor configured in each wing nacelle. In an embodiment the UAV system further comprises a nacelle configured on the vertical takeoff and landing fin module and a motor configured in the nacelle. In an embodiment the vertical tails module further comprises two tail fins.

In an embodiment the UAV system further comprises two interfaces on the blended wing body module, wherein each of the two interfaces comprise a quick lock/release mechanism compatible with the high speed long range wing modules and the low speed high endurance wing modules.

In an embodiment the UAV system further comprises a control system housed in the blended wing body module, the control system further comprising a computer system, the computer system comprising: at least one processor and a computer-usable medium embodying computer program code, the computer-usable medium capable of communicating with the at least one processor, the computer program code comprising instructions executable by the at least one processor and configured for controlling the modular UAV system.

In an embodiment, the two interfaces further connect the control system to one of: each of the at least two high speed long range wing panel modules and each of the at least two low speed high endurance wing panel modules. In an embodiment a logic circuit is housed inside each of at least one of the high speed long range wing module, the low speed high endurance wing module, and the vertical takeoff and landing fin, wherein the logic circuit interfaces to the control system.

In an embodiment, a modular ground and aerial autonomous vehicle system comprises a blended wing body module, at least two high speed long range wing panel modules configured to interchangeably mount to the blended wing body module, at least two low speed high endurance wing panel modules configured to interchangeably mount to the blended wing body module, a vertical tails module configured to interchangeably mount to the blended wing body module, a power train, and a wheels module that may be fixed or retractable and is operably connected to the power train.

In an embodiment the modular ground and aerial autonomous vehicle system further comprises two interfaces on the blended wing body module, wherein each of the two interfaces comprise an electronic quick lock/release mechanism compatible with the high speed long range wing modules and the low speed high endurance wing modules. In an embodiment the modular ground and aerial autonomous vehicle system further comprises a propeller operably connected to the power train.

In an embodiment the power train further comprises an electric motor, a transmission, and a drive shaft connected to the transmission and configured to drive at least two wheels associated with the wheels module. In an embodiment the modular ground and aerial autonomous vehicle system further comprises at least one battery pack operably connected to the electric motor.

In an embodiment the modular ground and aerial autonomous vehicle system further comprises a control system housed in the blended wing body module, the control system further comprising a computer system, said computer system comprising at least one processor and a computer-usable medium embodying computer program code, the computer-usable medium capable of communicating with the at least one processor, the computer program code comprising instructions executable by the at least one processor and configured for controlling the ground and aerial autonomous vehicle system.

In an embodiment the modular ground and aerial autonomous vehicle system further comprises the two interfaces further connect the control system to one of the at least two high speed long range wing panel modules and the at least two low speed high endurance wing panel modules. In an embodiment a logic circuit interfaces to the control system and is housed inside each of the at least two high speed long range wing panel modules and the at least two low speed high endurance wing panel modules, wherein the logic circuit interfaces to the control system.

In an embodiment a method comprises defining mission parameters for a modular autonomous vehicle, selecting one of a high speed long range wing module and a low speed high endurance wing module according to the mission parameters, mounting the selected one of the high speed long range wing module and the low speed high endurance wing module according to the mission parameters to a blended wing body module, selecting one of a vertical tails module and a vertical takeoff and landing fin module according to the mission parameters, and mounting the selected one of the vertical tails module and the vertical takeoff and landing fin module.

In an embodiment the method comprises connecting a control system to a motor associated with one of the high speed long range wing module and the low speed high endurance wing module. In an embodiment the method further comprises providing power to the motor associated with the selected one of the high speed long range wing module and the low speed high endurance wing module according to the mission parameters.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 9 depicts a table of wing airfoil characteristics and wing characteristics, in accordance with the disclosed embodiments;

FIG. 10 depicts a table of vertical tail and VTOL fin airfoil characteristics and vertical tail and VTOL fin design characteristics, in accordance with the disclosed embodiments;

FIG. 11 depicts a table of static loads and moment distributions, in accordance with the disclosed embodiments;

FIG. 12 depicts a table of propulsion system mission phase power calculations, in accordance with the disclosed embodiments;

FIG. 15 depicts steps associated with a method for selecting, designing, and assembling UAV components, in accordance with the disclosed embodiments;

DETAILED DESCRIPTION

Figure 1:
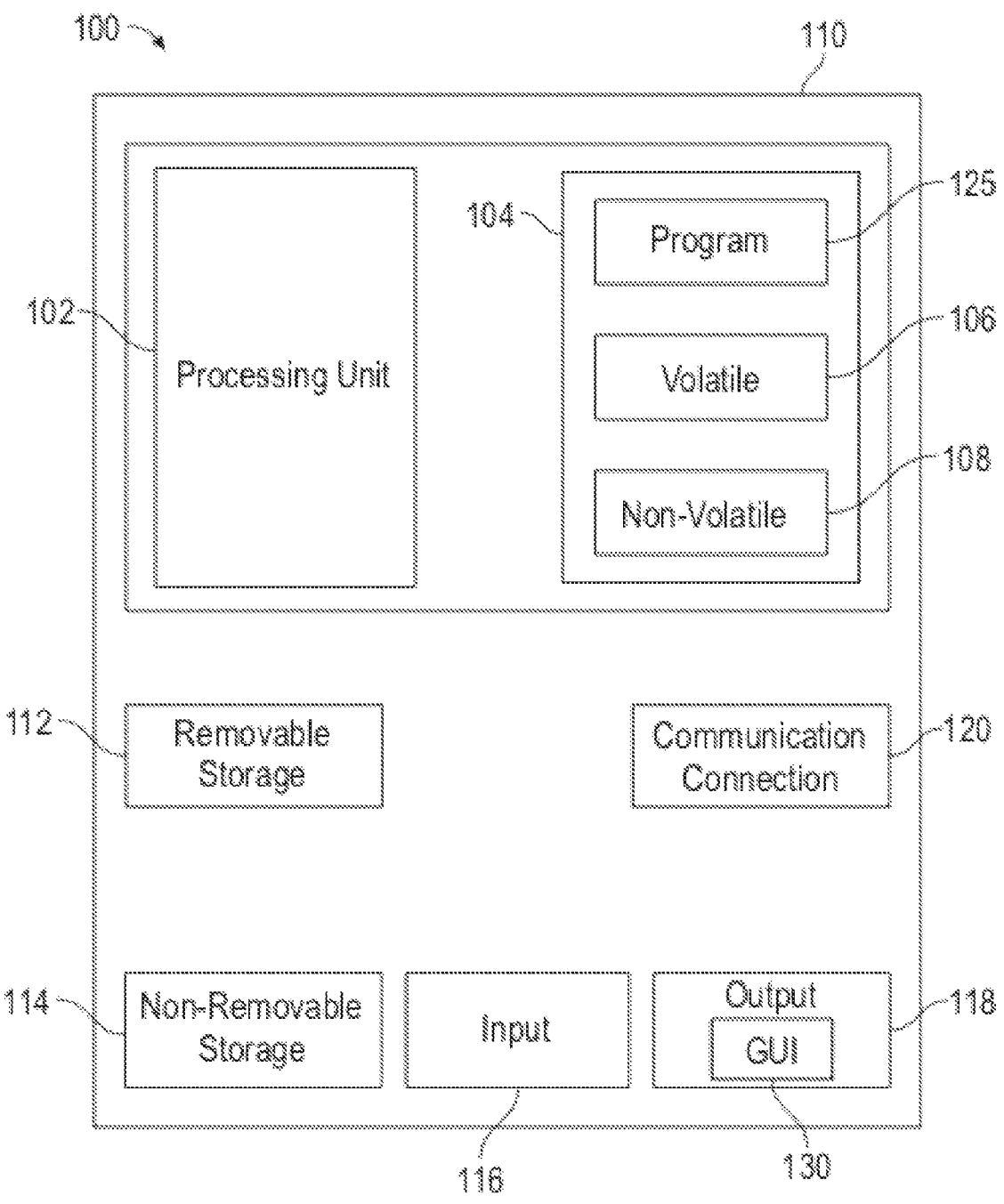
FIG. 1 depicts a block diagram of a computer system which is implemented in accordance with the disclosed embodiments.

Embodiments and aspects of the disclosed technology are presented herein. The particular embodiments and configurations discussed in the following non-limiting examples can be varied, and are provided to illustrate one or more embodiments, and are not intended to limit the scope thereof.

Reference to the accompanying drawings, in which illustrative embodiments are shown, are provided herein. The embodiments disclosed can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 2:
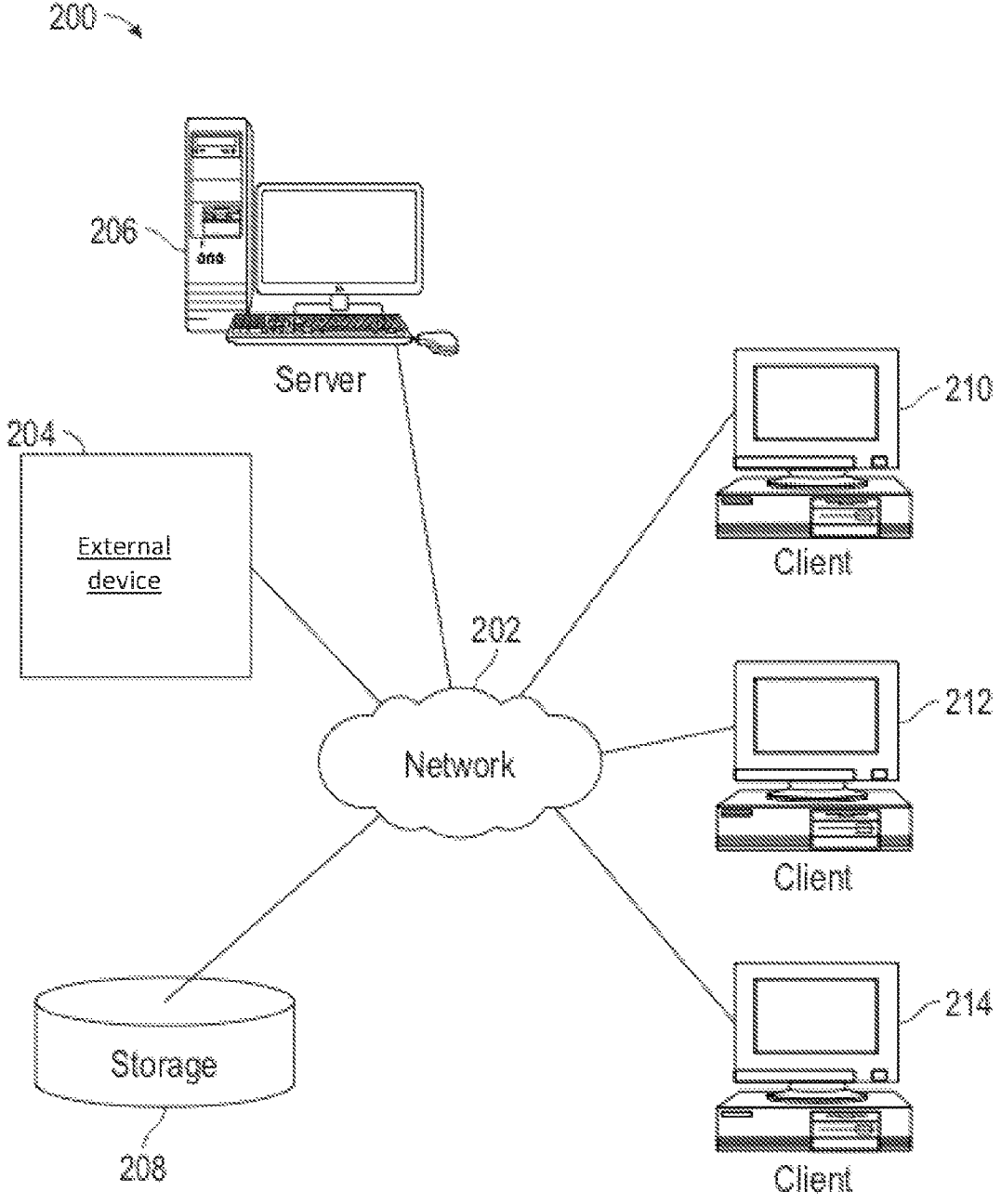
FIG. 2 depicts a graphical representation of a network of data-processing devices in which aspects of the present embodiments may be implemented.
Figure 3:
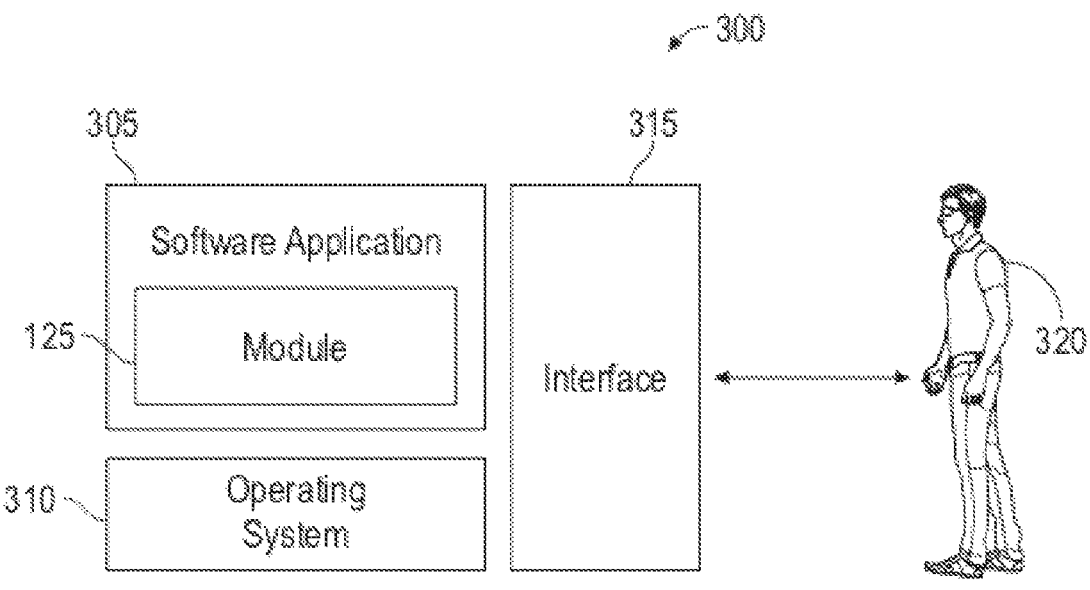
FIG. 3 depicts a computer software system for directing the operation of the data processing system depicted in FIG. 1, in accordance with an example embodiment.

FIGS. 1-3 are provided as exemplary diagrams of data-processing environments in which embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is provided in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to input instructions to computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smart phones, sensors, controllers, actuators, speakers, "internet of things" devices, and the like, in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, one or more external devices such as device 204, and a memory storage unit such as, for example, memory or database 208. It should be understood that device 204 may be embodied as a detector device, controller, receiver, transmitter, transceiver, transducer, driver, signal generator, testing apparatus, control system for an autonomous vehicle or other such device.

In the depicted example, device 204, server 206, and clients 210, 212, and 214 connect to network 202 along with storage unit 208. Clients 210, 212, and 214 may be, for example, personal computers or network computers, hand-held devices, mobile devices, tablet devices, smart phones, personal digital assistants, controllers, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet, with network 202 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, LabView and the like. Therefore, the descriptions of the exemplary embodiments, which follow, are for purposes of illustration and not considered a limitation.

The embodiments disclosed herein are directed to unmanned aerial systems (UAS) or unmanned aerial vehicles (UAV) (terms which may be used interchangeably herein) designed with multiple modular components for wide-mission performance with inherent logic for flight performance and control. The UAV embodiments with modules that contain a motor or actuator can also contain a resistor-capacitor based circuit, such that when electrically interfaced to the controller via the blended wing body (BWB) 605, it produces a certain output voltage. The combination of voltages from all powered modules produces a unique signal that instructs the controller to employ specific throttle and control algorithms to obtain the desired performance from each UAV variant. For example, the high speed long range (HSLR) wing module 610 will output a different voltage compared to the low speed high endurance (LSHE) wing module 615 such that the controller will automatically expand the throttle curve to the motors for high speed long range flight, or restrict the throttle curve for low speed high endurance flight. As disclosed herein, various components of the UAS may be referred to as a 'parent-variant' or 'child-variant' which is meant to denote priority or hierarchy in the design process.

Figure 4:
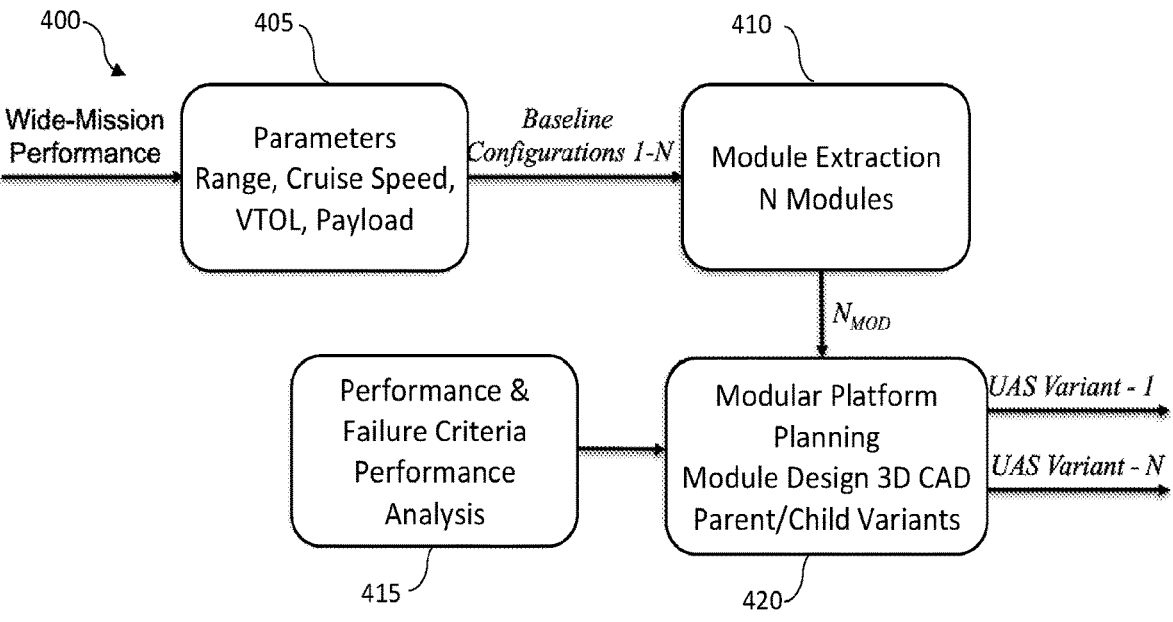
FIG. 4 depicts a block diagram of modules for designing and assembling a modular autonomous vehicle, in accordance with the disclosed embodiments.

FIG. 4 illustrates a flow chart associated with a process used to select and design appropriate modules for a UAS in accordance with the disclosed embodiments. First inputs 405 can include primary mission performance requirements such as range, cruise speed, VTOL capability, and payload. Large variances in these parameters may exist. As such, multiple baseline configurations of UAVs are possible. The module extraction 410 accepts first inputs 405 and then reduces the number of possible unique modules, represented as N modules.

The modules can comprise airframe components. For example, for a fixed-wing UAV, modules can include (but are not limited to) a wing or wing panel module, a fuselage, and vertical and horizontal stabilizers. The number of unique modules can be modeled using 3D design software. First-order sizing and performance analysis for such modules can be performed taking into account user-defined performance and failure criteria 415. Modular platform planning 420 can include performance analysis that can include basic propulsion and stability analysis for each UAV variant. Based on installed power and stability coefficients or static margin calculations, the parent-variant to the UAV variant/s with the highest demands can be designated, while the child-variants' propulsion and stability demands are naturally self-satisfied. The selection of, and design of, secondary components, such as electric motors and size of flight control surfaces are thus a result of the parent-variant analysis.

Figure 5:
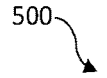
FIG. 5 depicts a table of wide mission parameters, in accordance with the disclosed embodiments.

In an exemplary embodiment, a modular UAS is disclosed. The modular UAS can be a multi-role reconfigurable system, envisioned to fulfill missions for a wide range of purposes including commercial applications in the field of oil and gas, delivery and logistics, police and law enforcement, building inspection, etc. From these basic criteria, mission profiles can be developed. An exemplary table of mission performance criteria are illustrated in Table 500 of FIG. 5.

From these criteria, the modular UAS can be selected to be a blended wing body (BWB) flying wing configuration comprising of two primary UAV variants designed for distinct flight performance: high speed long range (HSLR)

and low speed high endurance (LSHE). The two secondary variants enable vertical takeoff and landing (VTOL) to the LSHE and HSLR variants.

Figure 6:
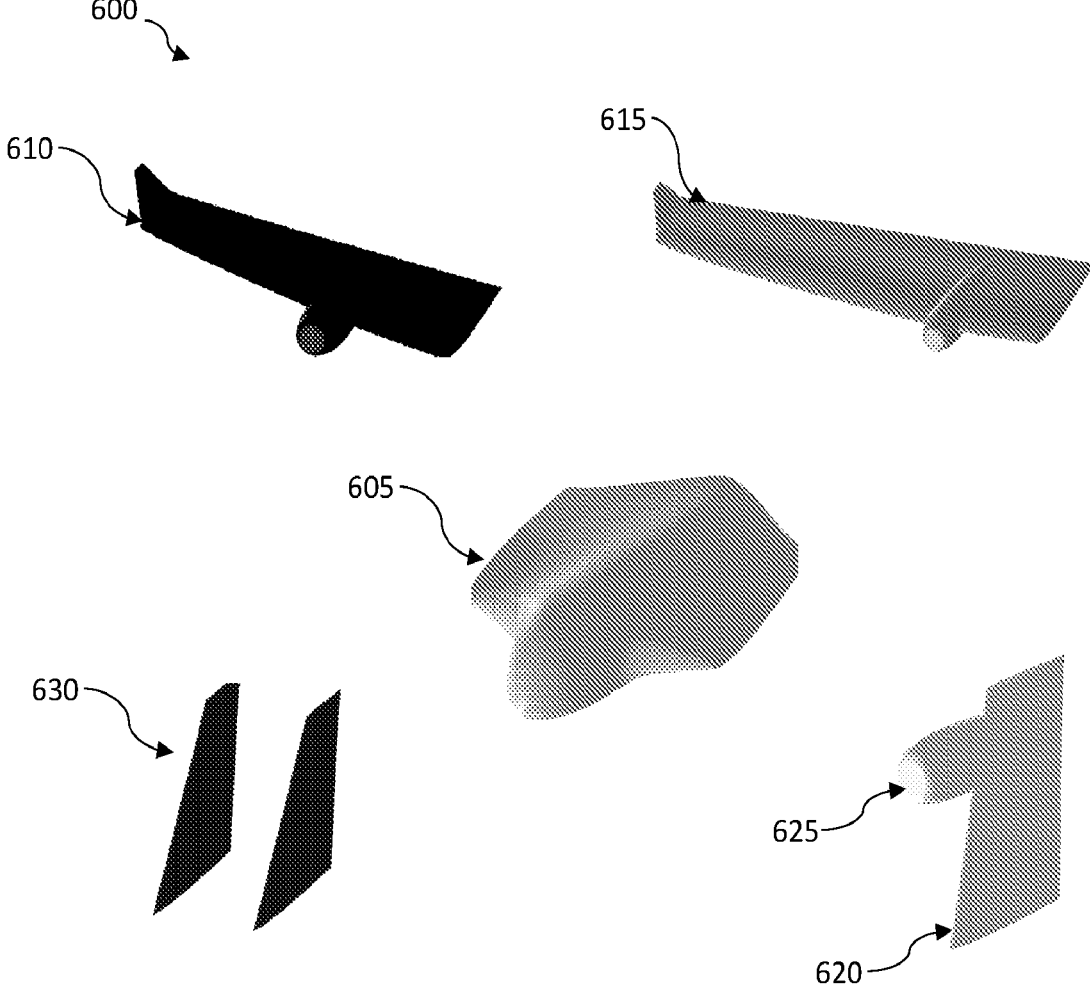
FIG. 6 depicts a selection of modular components associated with a modular UAV, in accordance with the disclosed embodiments.

FIG. 6 illustrates modules associated with a modular UAS 600, in accordance with the disclosed embodiments. Modular components associated with a modular UAS 600 can include a central body 605, an HSLR wing module 610, and an LSHE wing module 615, and vertical tails module 630. The secondary variants enabling VTOL can be achieved by two removable fins 620 with electric motor propulsion units 625 such that the UAV takes off vertically as a tail-sitter and transitions to forward flight by producing a pitching moment using wing-mounted flaps and/or by creating differential thrust between the two propulsion units. In this regard, the VTOL variants are referred to as a tilt-body design. Flight performance in terms of LSHE and HSLR is largely defined by the wing design and propulsion power.

To meet these criteria two separate wing modules, the HSLR wing module 610 and an LSHE wing module 615, with their own design characteristics are required. When considering the wing design for each variant, a cruise phase portion of flight can be considered, defined by the cruise Mach, payload, and wing loading, among other possible factors. For purposes of this example, the payload can be assumed to be equal for all four variants, while the mean cruise speed and wing loading can be set as, for example, M=0.06 (72.6 km/h) and WT O/S=9.3 kg/m2 respectively for LSHE, and M=0.1 (121.0 km/h), WT O/S=14.6 kg/m2 for HSLR. The wing loading for the respective VTOL enabled variants is slightly higher due to exchanging dual vertical tails 630 for dual VTOL fins 620 with internal motor 625. It should be appreciated that these are idealized figures, and that it is expected that both cruise speed and wing loading can vary depending on the exact mission parameters.

Figure 7A:
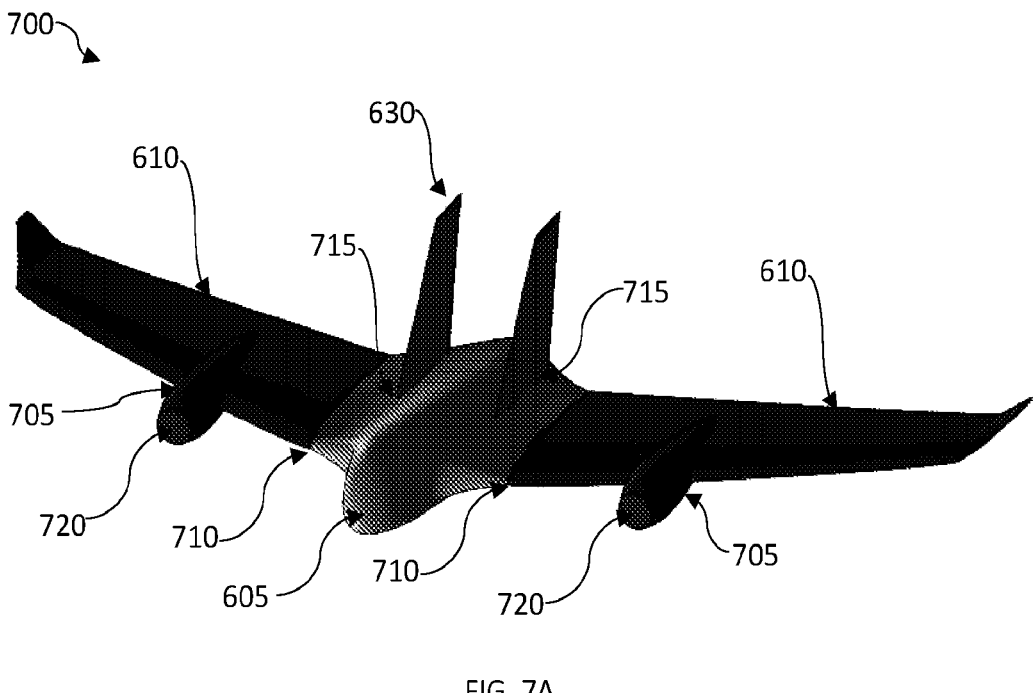
FIG. 7A depicts a configuration of a modular UAV, in accordance with the disclosed embodiments.

FIG. 7A illustrates an embodiment of an HSLR UAV variant 700 in accordance with the disclosed embodiments. The center body or BWB 605 of the HSLR UAV holds the airframe structure together. The center body 605 can further comprise a housing for internal components which can include control modules, power control systems, and power supplies such as batteries. In certain embodiments, these systems can comprise computer systems as illustrated in FIGS. 1-3. The BWB 605 was designed to be as streamlined as possible. The internal volume of the center body 605 can comprise a payload space, battery, such as a 4-cell 10-12 Amp-hour lithium polymer battery, and other electronic components.

It should be appreciated that the same BWB center body module 605 can be utilized for some or all variants of the modular system. While this offers certain logistical advantages, it also poses a unique design constraint in that both LSHE wing modules 615 and HSLR wing modules 610 must mechanically connect to the BWB. As such, the BWB 605 can include an interface 710 (the profile of which is described as the root airfoil) which comprises a quick lock/release mechanism which is compatible with both wing modules. The quick lock/release interface 710 can include an electrical connection, a mechanical connection, and a logic interface. The universal nature of the quick lock/release interface allows the control modules in the BWB 605 to easily and securely connect to either wing module, and also to provide power and/or control to power systems and/or control systems associated with the respective wing modules. To that end, the wing root airfoil and chord can be designed to be the same for both the HSLR wing module 610 and the LSHE wing module 615. For example, in certain embodiment both wing root airfoils can comprise a symmetric Eppler 171 airfoil with a chord length of 0.254 m.

The HSLR wing module 610 includes a wing nacelle 705 configured along the wing module 610 and configured to house a motor 720. It should be appreciated that the interface 710 allows the control module housed in the BWB 605 to provide power and control instructions to the motor(s) 720.

While the wing modules can have certain similar characteristics, The HSLR wing module 610 can further include blending of wing root and tip airfoils, winglets, and wing-mounted nacelles 705.

The HSLR UAV variant 700 can further make use of twin vertical tails 630 used for directional stability in forward-flight only mode. The tail interface 715 between the vertical tails 630 and the BWB 605 can be mechanical, allowing the vertical tails 630 to be quickly and securely mounted to, or removed from, the BWB 605.

The HSLR UAV variant, thus provides a high speed long range UAV. While this embodiment does not offer VTOL, it provides maximized high speed long range mission support.

Figure 7B:
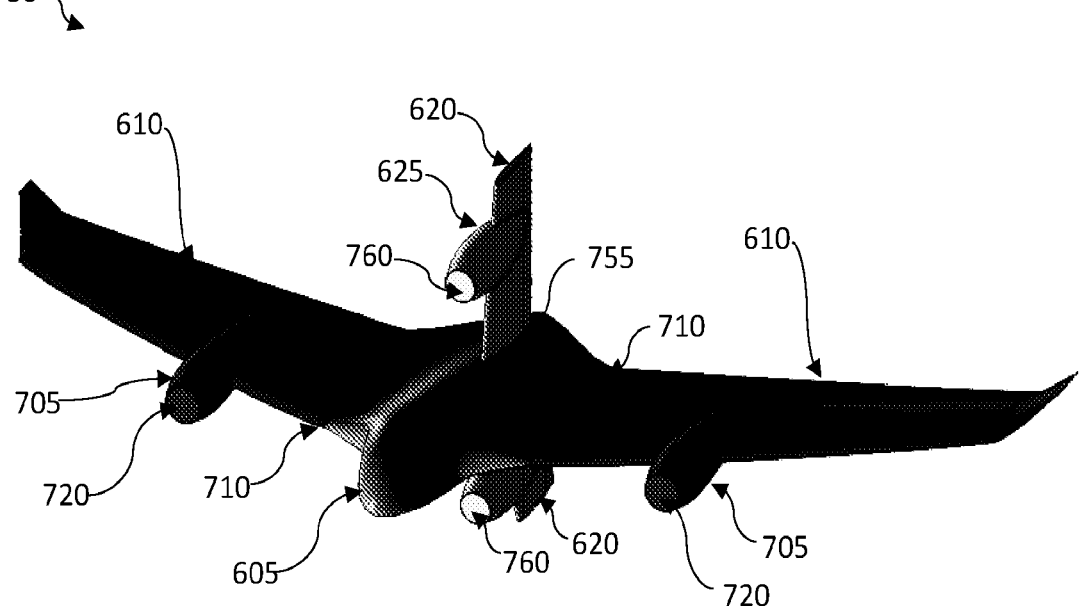
FIG. 7B depicts another configuration of a modular UAV, in accordance with the disclosed embodiments.

FIG. 7B illustrates an embodiment of an HSLR UAV VTOL 750 variant with vertical takeoff and landing capabilities, in accordance with the disclosed embodiment. As with the HSLR UAV variant 700, the center body 605 of the HSLR UAV (or BWB) comprises a housing for internal components which can include control modules and power control systems.

The BWB 605 can include an interface 710 which comprises a quick lock/release mechanism which is compatible with the HSLR wing module 610 which includes a wing nacelle 705 configured along the wing module 610 and configured to house a motor 720. It should be appreciated that the interface 710 allows the control module housed in the BWB 605 to provide power and control instructions to the motor(s) 720.

The HSLR UAV VTOL 750 includes twin VTOL fin modules 620 with the propulsion units 625 which can comprise nacelles configured to house motors 760, for the VTOL-enabled variants. The VTOL fin modules 620 also serve as vertical stabilizers for directional stability. The VTOL fins can connect to the BWB 605 at interface 755. Interface 755 comprises a quick lock/release that can include an electrical connection, a mechanical connection, and a logic interface. The universal nature of the quick lock/release interface 755 allows the control modules in the BWB 605 to easily and securely connect to the VTOL fin modules 620, and also to provide power and/or control to power systems and/or control systems associated with the VTOL fin modules 620.

The HSLR UAV VTOL 750 variant, thus provides a high speed long range UAV with VTOL capability. While this embodiment does offer VTOL it also may sacrifice a certain measure of performance and/or range in order to support VTOL capabilities.

Figure 8A:
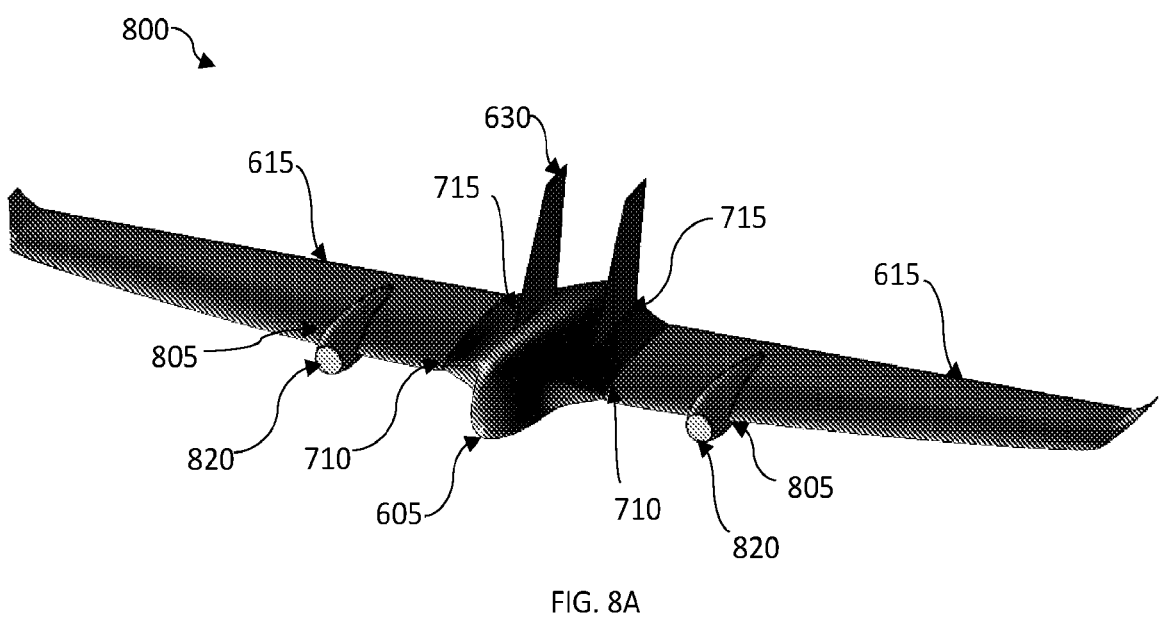
FIG. 8A depicts another configuration of a modular UAV, in accordance with the disclosed embodiments.

FIG. 8A illustrates an embodiment of an LSHE UAV variant 800 in accordance with the disclosed embodiments. The center body 605 of the LSHE UAV (or BWB) holds the airframe structure together. The center body 605 can further comprise a housing for internal components which can include control modules and power control systems. The internal volume of the center body 605 can comprise a payload space, battery, such as a 4-cell 10-12 Amp-hour lithium polymer battery, and other electronic components.

The BWB 605 can include an interface 710 which comprises a quick lock/release mechanism which is compatible with both wing modules. The quick lock/release interface 710 includes an electrical connection, a mechanical connection, and a logic connection which is the unique output signal from each powered module. Passive modules such as vertical tails 630 only contain a mechanical connection. The universal nature of the quick lock/release interface allows the control modules in the BWB 605 to easily and securely connect to the LSHE wing module 615, and also to provide power and/or control to power systems and/or control systems associated with the wing module. The quick lock/release interface includes a custom interlocking male/female rail with multiple side-mounted metal (e.g., copper) contacts that mate from a powered module to the BWB 605. This interface can be 3D printed or otherwise manufactured using current advanced techniques that allow integrated designs of nylon with carbon fiber for mechanical strength, and copper material for the electrical contacts. The wing root airfoil and chord is a module constraint that is the same for both the HSLR wing module 610 and the LSHE wing module 615.

The LSHE wing module 615 includes a wing nacelle 805 formed on the wing module 615 and configured to house a motor 820. It should be appreciated that the interface 710 allows the control module housed in the BWB 605 to provide power and control instructions to the motor(s) 820.

The LSHE UAV variant 800 can further make use of twin vertical tails 630 used for directional stability in forward-flight only mode. The tail interface 715 between the vertical tails 630 and the BWB 605 can be mechanical, allowing the vertical tails 630 to be quickly and securely mounted to, or removed from, the BWB 605.

The LSHE UAV variant, thus provides a configuration for low speed high endurance applications. While this embodiment does not offer VTOL, it provides maximized efficiency for high endurance mission support.

Figure 8B:
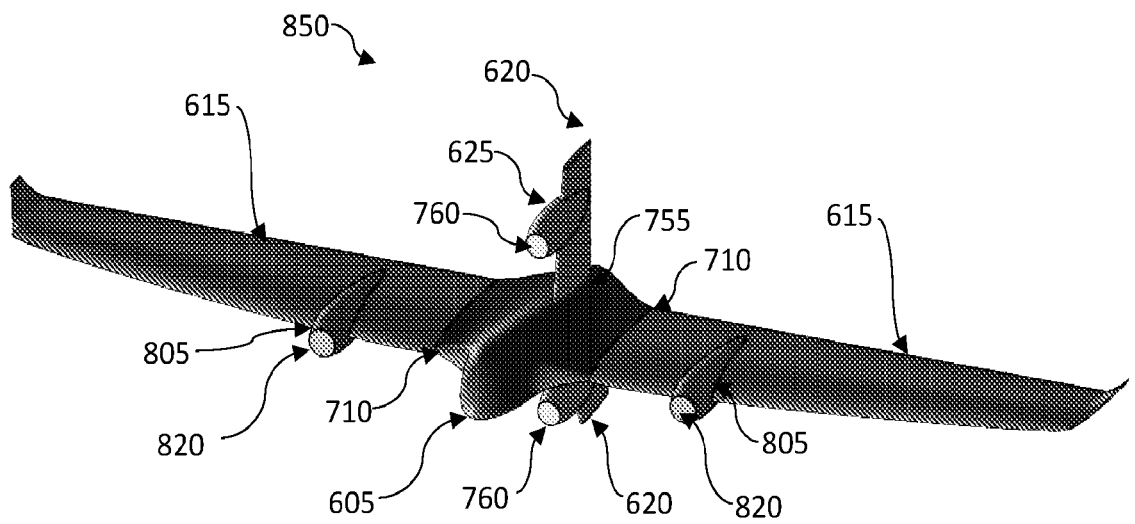
FIG. 8B depicts another configuration of a modular UAV, in accordance with the disclosed embodiments.

FIG. 8B illustrates an embodiment of an LSHE UAV VTOL 850 variant with vertical takeoff and landing capabilities, in accordance with the disclosed embodiment. As with the LSHE UAV variant 800, the center body 605 of the LSHE UAV (or BWB) comprises a housing for internal components which can include control modules and power control systems.

The BWB 605 can include an interface 710 which comprises a quick lock/release mechanism which is compatible with the LSHE wing module 615 which includes a wing nacelle 805 configured along the wing module 610 and configured to house a motor 820. It should be appreciated that the interface 710 allows the control module housed in the BWB 605 to provide power and control instructions to the motor(s) 720.

The LSHE UAV VTOL 850 includes twin VTOL fin modules 620 with the propulsion units 625 which can comprise nacelles configured to house motors 760, for the VTOL-enabled variants. The VTOL fin modules 620 also serve as vertical stabilizers for directional stability. The VTOL fins can connect to the BWB 605 at interface 755. Interface 755 comprises a quick lock/release that can include an electrical connection, a mechanical connection, and a logic interface. The universal nature of the quick lock/release interface 755 allows the control modules in the BWB 605 to easily and securely connect to the VTOL fin modules 620, and also to provide power and/or control to power systems and/or control systems associated with the VTOL fin modules 620.

The LSHE UAV VTOL 850 variant, thus provides a low speed long range UAV with VTOL capability. While this embodiment does offer VTOL, it sacrifices a certain measure of performance and/or range in order to support VTOL capabilities.

Aspects of the LSHE wing module 615 and HSLR wing module 610 are more fully disclosed herein. The wing modules and UAV variants are designed to cruise at the vehicle's maximum lift-to-drag ratio (L/D) for optimal range and endurance. The lift coefficient, calculated using the respective wing area, cruise weight and speed, must operate at the wing's optimum L/D. For 3D wing geometry where different wing root and tip airfoils are used this can be a complicated problem. The aerodynamic drag coefficient, CD of the wing can be estimated using first-order finite wing theory. This accounts for the base drag coefficient, CDo by assuming the Blasius flat-plate laminar flow skin-friction coefficient (up to Re≃5×105). A form factor, F can be used to account for the form drag of the wing using the cruise speed number, x/c location and sweep angle at the maximum thickness point of the wing, which can be multiplied to the base drag coefficient. In addition, a wing interference factor, Q of 1.2 can be used to account for the drag penalty of wing-mounted nacelles. The induced drag coefficient, CDi is computed according to equation (1)

$$\frac{C_L^2}{\pi A e} \tag{1}$$

Where, the lift coefficient, CL, wing aspect ratio A, and the Oswald efficiency, e is assumed to be 0.85. The goal of this first-order aerodynamics analysis is to obtain an estimate of drag for the wing in cruise (in addition to the center body and vertical stabilizers) in order to obtain the forward-flight power, and ultimately, the energy required to complete the missions illustrated in Table 500.

The wing can include a wing root airfoil constraint. Due to the sharing of the same BWB module 605 across embodiments, the root airfoil which connects to the BWB, is the same for both the HSLR and LSHE wing modules. In the exemplary embodiments, based on the calculations above, the root airfoil can comprise an Eppler 171 airfoil which is a 12.28% thick symmetric airfoil. The larger thickness is ideal for a BWB, while the zero camber produces no pitching moment during cruise which helps in avoiding a negative pitch down moment, particularly for flying wing configurations that lack a horizontal stabilizer. It should be appreciated that the above parameters are exemplary. In other embodiments where other mission objectives demand different parameters, other root airfoil characteristics can be selected.

The wing tip airfoils for the LSHE can be selected to be an Eppler 330, and the wing tip airfoils for the HSLR can be selected to be an Eppler 182. Both of these airfoils are considered 'flying wing' airfoils, which signifies that they possess a characteristic on the trailing edge called reflex. This produces a positive pitch up moment at cruise angles of attack to compensate for the lack of a conventional horizontal tail. Flying wing designs with low leading edge wing sweep require a high degree of reflex on the airfoil to create a larger positive pitch moment because the center of gravity of the UAV lies closer to the center of pressure of the mean aerodynamic chord of the wing. At a certain Reynolds number these airfoils have a pitching moment coefficient, Cm of around 0.04 for the Eppler 330, and 0.01 for the Eppler 182 at low angles of attack. Relevant characteristics of the airfoils and wings are summarized in charts 900 and 950 provided in FIG. 9.

Other wing design parameters include the aspect ratio, leading edge sweep, and taper ratio. The local wing thickness can be assumed to be equal to the airfoil thickness. The leading edge contains a slight elliptical distribution, while the trailing edge is straight. A small swept winglet is included at the wing tips of both LSHE wing module 615 and the HSLR wing module 610 and contains a span of 5 cm and a 30 degree tangent to the horizontal. Finally, streamlined nacelles are formed on the inboard region of wings and are designed to house a motor which can comprise an electric motor. In certain embodiments, the electric motor can comprise a Hacker model A30-16M V4, or other such motor sized for the power requirements of the specific configuration.

The blended wing body 605 (also referred to as a "blended wing body module" or a "BWB") airframe includes a combination of airfoil-like features and higher-order polynomial functions. The center side view cross-section shape of the BWB 605 can comprise a modified MH 81 'flying wing' airfoil with slight reflex. The airfoil thickness can be selected to accommodate the internal volume requirements. Exemplary length and width of the BWB 605 can be 51.82 cm and 30 cm respectively, although other sized BWBs can be used in other embodiments. The planform shape of the BWB 605 including the nose area, can comprise a series of 3rd and 4th order polynomials. Three frontal cross-sections can be defined along the length of the BWB 605 in order to properly loft these curves into surfaces of the body. In order to determine specific characteristics of the BWB 605 a static loads analysis can be performed with the estimated weight, size, and location of all major airframe and internal components. The drag of the BWB 605 can also be estimated by splitting the body into spanwise elements, and computing their elemental drag, based on the local dynamic pressure, skin friction coefficient, and elemental surface area.

The main consideration for vertical stabilizers is that enough surface area is contained for directional stability. Certain embodiments are sized with unusually large vertical tails 630 due to the short BWB lengths. The vertical tails 630 can be placed as far aft as possible on the BWB 605. The vertical tail planform area can be sized according to equation (2):

$$S = \frac{C_{VT} b_W S_W}{l_{VT}} \qquad (2)$$

Where the vertical tail coefficient, Cvt was set as 0.015 and the length, lvt between the quarter chord of the mean aerodynamic chord of the wing and that of the vertical tail was estimated as 21 cm. The wing area and span of the LSHE variant can be used for the calculation. In certain embodiments, the vertical tail airfoil can be selected to be the NACA 0006, which minimizes the base drag coefficient.

The VTOL fin module 620 can comprise vertical fins configured to enable VTOL, which are designed around the nacelles 625 with internal motors 760 as well as the intended propeller diameter of approximately 10 inches for these embodiments. The fin planform area can be larger than the vertical tail area to ensure that the fins can double as vertical stabilizers and add sufficient directional stability during flight. The motors 760 can be the same as those used on the wing. During VTOL and full forward flight all four motors can be driven at the same power setting. In certain embodiments, a thicker NACA 0010 airfoil can be used for the fins in order to add structural rigidity. Exemplary vertical tail and fin characteristics are given in table 1000 and table 1050.

Propulsion analysis can be performed for the various disclosed modular subsystems. The analysis can be applied for different phases of a typical mission, including VTOL climb, hover, fixed-wing cruise, and VTOL descent. The analysis can account for the various mission parameters in order to identify the most suitable configuration of the modular UAS 600. The thrust-to-takeoff weight ratio, T/WT O which is a propulsion sizing parameter, is invoked for hover, VTOL climb and descent. Given an estimate of the takeoff weight of the UAV, the required thrust can be determined, and can then be used to calculate the electrical propulsion power, Pelec using the ideal power in hover, Pi and the propulsion system efficiency, Πη. The propulsion system efficiency is equivalent to the product of the component efficiencies: propeller efficiency, η pr o p, electric motor efficiency, ηmot, gearbox efficiency, ηgear and electronic distribution efficiency, ηe-dist. In fixed-wing forward flight, the electrical propulsion power can be calculated by estimating the total UAV drag, DUAV in steady cruise (sum of the air frame component drag).

The propulsion system efficiency and the forward flight power, PFF=DUAVVC, equal to the product of UAV drag and cruise speed. A summary of the mission phases, thrust-to-takeoff weight criteria, and equations for calculation of electrical motor power are given in table 1100 illustrated in FIG. 11. The energy required for each phase can be calculated as the product of the phase electrical power and time, in units of Wh. Finally, the required battery mass, Mbatt to complete the stated mission is obtained using the expression, energy, Espec. For lithium polymer (LiPo) batteries used in UAS, a good mean value is Espec=160 Wh/kg. The battery efficiency, ηbatt accounts for heating losses, approximated as 0.95 and the factor, fusable is the permissible battery depth of discharge as a percentage of the total stored energy which is approximately 80% for modern LiPo batteries.

The highest power requirements for the HSLR-VTOL variant are in VTOL climb. The calculation for electric power is calculated by assuming that each of the four motor-propeller propulsion units must generate thrust equivalent to, T=(1.3WT O)/4. The UAV takeoff weight can be estimated by first employing a structure factor of 0.65, which is reasonable for the disclosed UAS which can be made from composite materials such as carbon fiber. This signifies that the 35% of the entire takeoff weight comes from the weight of the LiPo battery and payload. A maximum payload of 0.5 kg is used based on the air delivery mission in Table 5. A nominal size LiPo battery appropriate for the disclosed systems is based on a 4 cell (14.4V) 10 Amp-hour capacity battery. It can further be assumed that such a battery weighs approximately 1 kg. From these figures, the takeoff weight of the UAV can be estimated to be 4.29 kg. With the thrust-to-weight ratio, T/WT O=1.3 we compute the thrust provided by each propulsion unit as 13.66 N. Using the ideal power equation and propulsion efficiency as disclosed, an electric input power of 326 W per motor may be appropriate. With this power requirement, a high-quality electric motor can be selected. The Hacker model A30-16M V4, or other similar motor will suffice. The motor can be rated at a power input up to 400 W with a 4-cell battery, and can be capable of generating 13.66 N in VTOL climb with a 10-inch propeller. With this power analysis, all other mission phase power requirements for the other UAV variants are self-satisfied. The modular UAV system can be assembled accordingly.

A static loads analysis can be completed in order to estimate the magnitude of the static margin for any one of the disclosed variants. For example, the UAV center of gravity, xCG can be determined from a moment balance of the component loads and resultant included on Table 1100 in FIG. 11. In an exemplary embodiment, the center of pressure where the resultant of wing lift occurs is assumed to act at xC P/c=0.32 of the mean aerodynamic chord of the wing. The center of gravity is calculated as the sum of the moment components, −15.26 cm-kg divided by the sum of the load magnitudes, 4.18 kg plus the location of the center of pressure. In this analysis, the absolute locations are xCP=28.28 cm and xCG=24.63 cm. The static margin, which is a quantitative measure of the longitudinal (pitching) stability of the UAV is calculated according to equation (3):

$$SM = \frac{x_{CP} - x_{CG}}{m.a.c} = 0.18 \qquad (3)$$

An SM value of 0.18 signifies that a significant stable pitch-down moment can be created during flight when a disturbance is encountered. This analysis self-satisfies the static stability of the other UAV variants, where higher more stable SM values can be calculated given the more aggressive sweep of the HSLR wing.

The objective of mission profile analysis is to determine, for a specific UAV, whether a specific mission can be completed given the energy density of the onboard battery. Alternatively, the takeoff mass of the UAV and/or mass of the battery can be estimated by specifying the specific energy of the battery. In such an analysis, the required energy for each phase of the three exemplary missions defined on Table 500 can be computed according to the formulation on Table 1200 in FIG. 12 and equation (4).

$$M_{batt} = \frac{\Sigma E_{phase}}{E_{spec} \eta_{batt} f_{usable}} \qquad (4)$$

As an example, with the total mission energy, the mass of the LiPo battery (with Espec=160 Wh/kg) required was computed. The calculations were completed at a cruising altitude of 61 m above sea level, where the air properties are density, ρ=1.22 kg/m3 and kinematic viscosity, ν=1.48× 10−5 m2/s. A breakdown of the energy required for each mission phase, total mission energy, and mass of the required battery is given in Table 1300 in FIG. 13. It should be noted that for some missions, more energy and thus a larger battery is required compared to the nominal 4-cell 10 Amp-hour battery with approximately 121.6 W h of usable energy at a mass of 1 kg as illustrated in this exemplary embodiment.

In another embodiment, a unmanned ground aerial vehicle (UGAV) is disclosed. In certain embodiments, aspects of the modular aircraft concept disclosed above can be incorporated in the disclosed embodiments of the UGAV.

Figures 13, 14A:
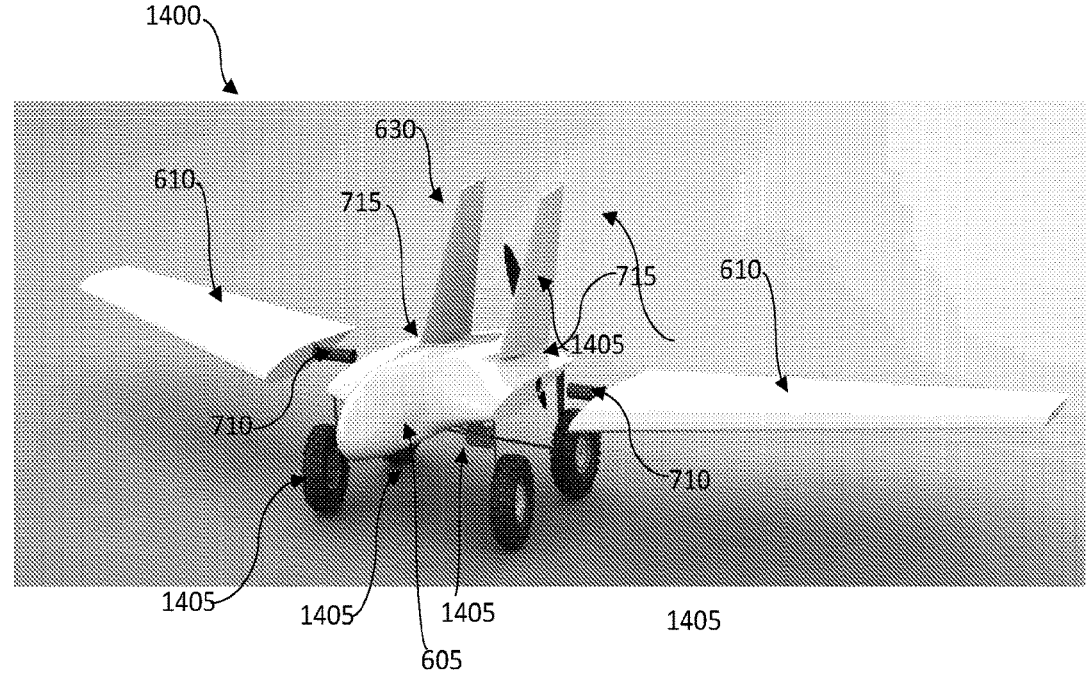
FIG. 13 depicts a table of mission phase energy and battery mass, in accordance with the disclosed embodiments.
FIG. 14A depicts a configuration of a modular UGAV, in accordance with the disclosed embodiments.

An exemplary embodiment of a UGAV 1400 is illustrated in FIG. 14A. In the illustration in FIG. 14A the UGAV 1400 includes a central body or BWB 605, an HSLR wing module 610, and an LSHE wing module 615, and vertical tails module 630. However, it should be appreciated that, in other embodiments, any of the modular aspects illustrated in FIGS. 6-8 can be incorporated in the UGAV 1400.

As illustrated in FIG. 14A, a UGAV 1400 can include a unique blended wing body 605 that houses an electric powertrain 1410 operably connected to a multipurpose wheels module 1405 to operate as a ground vehicle in unprepared terrain. The UGAV 1400 is adapted to allow the UGAV to complete additional ground based objectives.

Figure 14B:
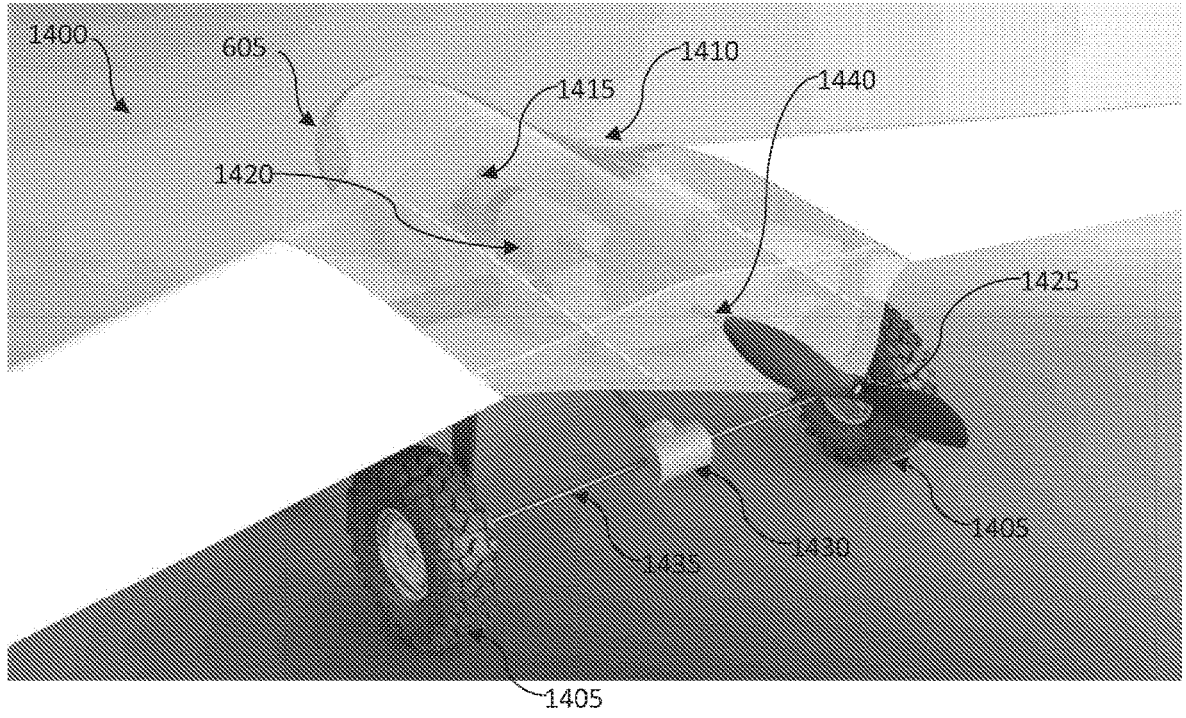
FIG. 14B depicts another view of a modular UGAV, in accordance with the disclosed embodiments.

FIG. 14B illustrates components of the electric powertrain 1410. The powertrain 1410 can include an electric motor 1415 which is connected to a transmission 1420 which can include a clutch. The clutch can include a drive shaft 1440 connected to rear propeller 1425. The transmission can further be connected to rear wheel drive 1430, which can serve to turn drive shaft 1435 which can be connected to wheels 1405.

The selection of modular components for a specific mission can broadly include defining aerial mission requirements (cruise speed, range, and payload capacity), performing a takeoff weight analysis, establishing ideal wing loading, followed by first-order analytical design of the wing, blended wing body, and vertical stabilizers. The electric propulsion system is selected based on the power requirements to produce sufficient thrust for takeoff and cruising flight. Longitudinal stability during flight is assessed by performing a static loads analysis about the vehicle center of gravity, and estimating the stability coefficient and static margin. Key UGAV design and other parameters that affect the vehicle dynamics and performance during ground and aerial operation can be considered in selecting the optimal modular configuration.

FIG. 15 illustrates steps associated with a method 1500 for selecting the design variables as required to meet mission parameters. The method begins at step 1505. Next, at step 1510 variables of interest and constraints can be defined. Such variables can include, but are not limited to, flight requirements such as cruise speed, range, endurance, and payload. Associated constraints are maximum flight and ground speed, as well as maximum flight altitude. These constraints are usually, but not always, set by the federal aviation administration (FAA).

Next at step 1515 a conceptual design process is performed in order to select the number of modules, and the design and geometry of the first-generation vehicle modules, based on a tradeoff between flight efficiency and development costs. The conceptual design process incorporates a performance model, which is a guiding set of equations between module design variables and performance outputs such as aerodynamic efficiency which has a direct consequence to range and endurance. Using the total number of unique modules with their own design characteristics, a number of UAV or UGAV variants, which are deemed to satisfy specific flight requirements for wide mission profiles, can be assembled in step 1520. Individual vehicle variants capture dynamics of different modules and components, such as those of the vehicle body, wing, powertrain, and supervisory controller. Modules can be coupled using two types of connections. The first type of connection is a dynamic connection. Dynamic connections relate dynamic states, inputs, and outputs between modules. For example, the propulsive force output by the powertrain acts as an input to the wheels to drive the vehicle forward. The other type of connection is a parametric connection. Parametric connections relate parameters between modules, including, but not limited to, design variables. An example of this is the mass of the powertrain components which is a term in the mass of the entire vehicle.

At step 1525 performance outputs can be evaluated using computational tools such as ANSYS and MATLAB. Performance outputs include metrics such as vehicle range, endurance, aerodynamic efficiency, vehicle stability, and state tracking. At step 1530 if performance does not meet desired expectations and objectives, a design iteration is initiated to repeat the conceptual design process and produce next-generation vehicle modules. If performance is satisfied, the method is completed and ends at 1535.

Figures 16, 17:
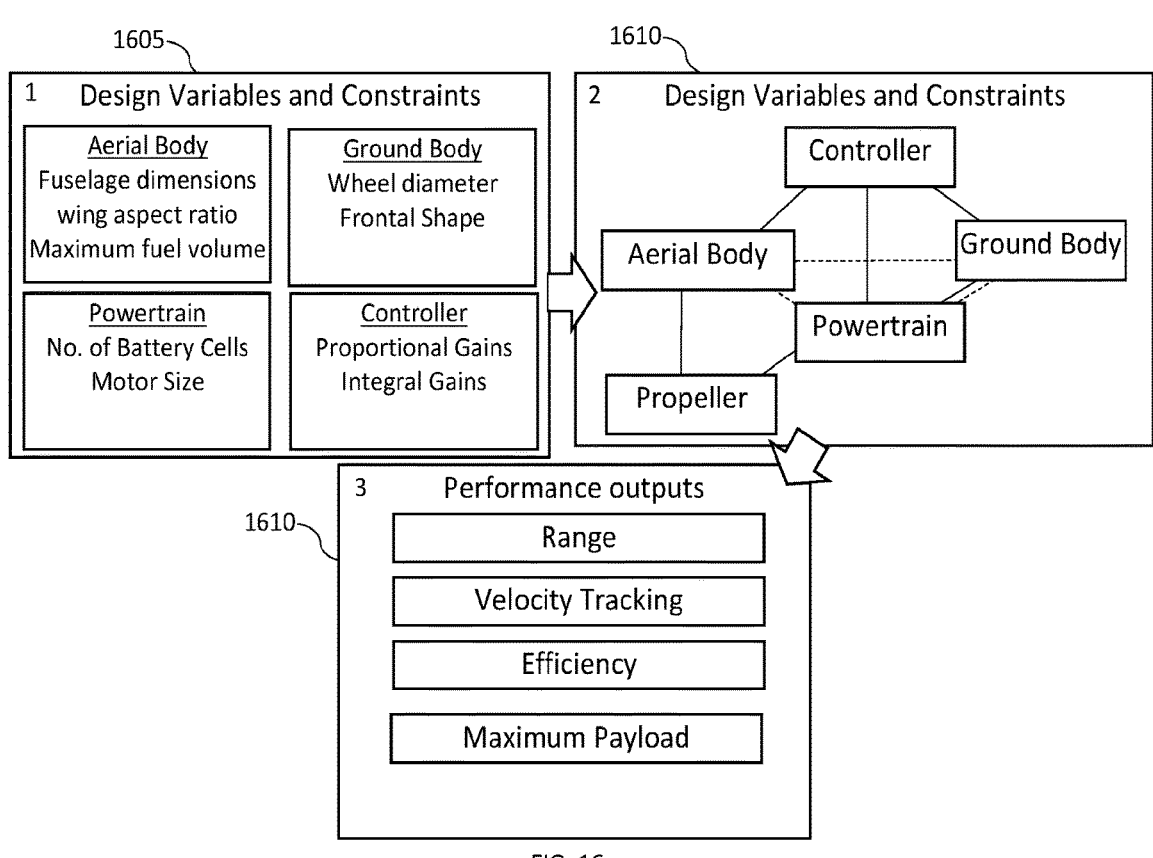
FIG. 16 depicts graphical steps associated with a method for selecting and assembling UAV components, in accordance with the disclosed embodiments.
FIG. 17 depicts a table of wing airfoil characteristics, in accordance with the disclosed embodiments.

FIG. 16 illustrates a graphical flow chart 1600 of the design framework for UGAV systems in accordance with the disclosed embodiments. The design framework includes identification of design variables and constraints at 1605. Five modules can be included in the performance model 1610, though this can be expanded upon to meet desired model accuracy. Performance outputs 1615 can be determined by evaluating the performance model through a dynamic simulation. Performance outputs 1605 include metrics such as vehicle range, efficiency, state tracking, and maximum payload.

In an exemplary embodiment, the UGAV 1400 can have a ground mode and an aerial mode. Aerial mode can be designed to cruise at or near the wing's maximum lift-to-drag ratio, L/D for optimal range and endurance. The design lift coefficient, calculated using the UAV weight and wing area must operate near the UAV variant's optimum L/D. For a 3D wing geometry where different wing root and tip airfoils are utilized and blended, it is difficult to estimate the L/D and identify the cruise angle of attack based on the decrease in lift-curve-slope, CLα of the wing compared to the 2D airfoils where data exists. The aerodynamic drag coefficient, CD of the wing can be estimated using first-order finite wing theory. This accounts for the base drag coefficient, CDo by assuming the Blasius flat-plate laminar flow skin-friction coefficient (up to Re≈5×105). A form factor, F that accounts for the form drag of the wing using the cruise Mach number, x/c location and sweep angle at the maximum thickness point of the wing was multiplied to the base drag coefficient. At the conceptual design stage, a wing interference factor Q that accounts for interference from the BWB and the ground wheels (if not retractable and exposed to the airflow) can be applied.

The induced drag coefficient, C is computed according to the common expression:

$$\frac{C_L^2}{\pi A e} \quad (5)$$

where the lift coefficient CL, wing aspect ratio A, and the Oswald efficiency, e assumed to be 0.85. First-order aerodynamics analysis can be used to obtain an estimate of drag for the wing in cruise (in addition to the center body and vertical stabilizers) in order to obtain the forward-flight power and ultimately the energy required to complete a mission. The wing is designed by blending two airfoils from the root, where it attaches to the BWB, to the wingtip. The airfoil characteristics and aerodynamic data at the approximate flight Reynolds numbers is included in Table 1700 in FIG. 17.

The blended wing body (BWB) airframe 605 can include a combination of airfoil-like features and higher-order polynomial functions. The center side view cross-section shape of the BWB 605 can comprise a modified MH 81 'flying wing' airfoil with slight reflex. The original airfoil thickness can be configured to accommodate the internal volume requirements of a BWB 605 design. The overall length and width of the BWB 605 can be 51.82 cm and 30 cm respectively, although other dimensions can be used according to design considerations. The planform (top-view) shape of the BWB 605 including the nose area are a series of 3rd and 4th order polynomials. Three frontal cross-sections can be defined along the length of the BWB 605 in order to properly loft these curves into surfaces of the body. Prior to setting the overall size of the BWB 605, a static loads analysis can be performed to estimate weight, size, and location of all major airframe and internal components. The drag of the BWB 605 can be estimated by splitting the body into 60 spanwise elements, dy and computing their elemental drag, dD based on the local dynamic pressure, skin friction coefficient, and elemental surface area, dS.

The main consideration for the design of the two vertical stabilizers 630 is to produce sufficient in-flight directional by sizing the tails properly. For the UGAV 1400 design vertical tails 630 are configured further aft on the body and away from the vehicle center of gravity. The vertical tail 630 planform area can be sized according to equation (2).

Where the vertical tail coefficient, CVT can, for example, be set as 0.015 and the length, lVT between the quarter chord of the mean aerodynamic chord of the wing and that of the vertical tail was estimated as 21 cm. The wing area and span of the LSHE variant can be used for the calculation. The vertical tail airfoil chosen is the NACA 0006, which minimizes the base drag coefficient.

The three degree-of-freedom aerial dynamics of the UGAV can be modeled with the longitudinal equations of motion, expressed in the following form:

$$m(\dot{U}+QW-RV)=-mg\sin\Theta+(-D\cos\alpha+L\sin\alpha)+T\cos\Phi_T$$

$$m(\dot{W}+PV-QU)=mg\cos\Phi\cos\theta+(-D\sin\alpha-L\cos\alpha)-T\sin\Phi_T$$

$$Q I_{yy}-PR(I_{zz}-I_{xx})=(P^2-R^2)I_{xz}=M_A+M_T \quad (6)$$

where the vehicle aerodynamic forces, lift L and drag D as well as thrust, T play a crucial role in the pitching rate, Q, pitching moment of the aircraft MA and the pitching moment due to thrust, MT. A series of linear acceleration terms QW, RV, and PV, QU along the x and z axes respectively, and angular momentum terms composed of the product of angular rates in roll, P and yaw, R with moments of inertia, I also describe the dynamics.

The propeller model used in this study is an expression of the figure of merit (FM) between the ideal power over the mechanical shaft power, given according to equation (7) as:

$$FM \approx 0.65 = \frac{\left(\frac{T^{3/2}}{\sqrt{2\rho A}}\right)}{Q\Omega} \quad (7)$$

where T is the thrust produced, ρ is the air density, and A is the propeller disk area. The shaft power is a product of the propeller torque, Q and its rotational speed, Ω. The value of 0.65 is approximate and is based on modern small propeller design and its ability to convert shaft power to thrust.

With respect to the ground mode, the ground body can be treated as a three-degree-of-freedom vehicle described by a bicycle model. The model describes vehicle motion on a two dimensional plane with longitudinal speed vx, lateral speed vy, and yaw rate r around the center of gravity. The equations of motion are presented as follows:

$$\dot{v}_x = v_y r + \tag{8}$$

$$\frac{1}{m}\left((F_{x,FL} + F_{x,FR})\cos\delta - (F_{y,FL} + F_{y,FR})\sin\delta + F_{x,RL} + F_{x,RR} - C_A v_x^2\right)$$

$$\dot{v}_y = v_x r + \frac{1}{m}((F_{x,FL} + F_{x,FR})\sin\delta - (F_{y,FL} + F_{y,FR})\cos\delta + F_{y,RL} + F_{y,RR})$$

$$\dot{r} = \frac{1}{J}(a((F_{x,FL} + F_{x,FR})\sin\delta + (F_{y,FL} + F_{y,FR})\cos\delta) - b(F_{y,RL} + F_{y,RR}))$$

where m is the vehicle mass, Fx and Fy are the longitudinal and lateral force respectively, subscripts FL, FR, RL, RR are abbreviations of tire label: front left, front right, rear left, rear right. The variables δ is the steering angle, CA is the air drag coefficient, j is the moment of inertia, a and b are the distance from the center of gravity to the front and rear axles respectively. The model takes the steering angle and propulsion forces, F as inputs. The propulsion forces are generated by the motor and delivered through the powertrain 1410.

Figure 18:
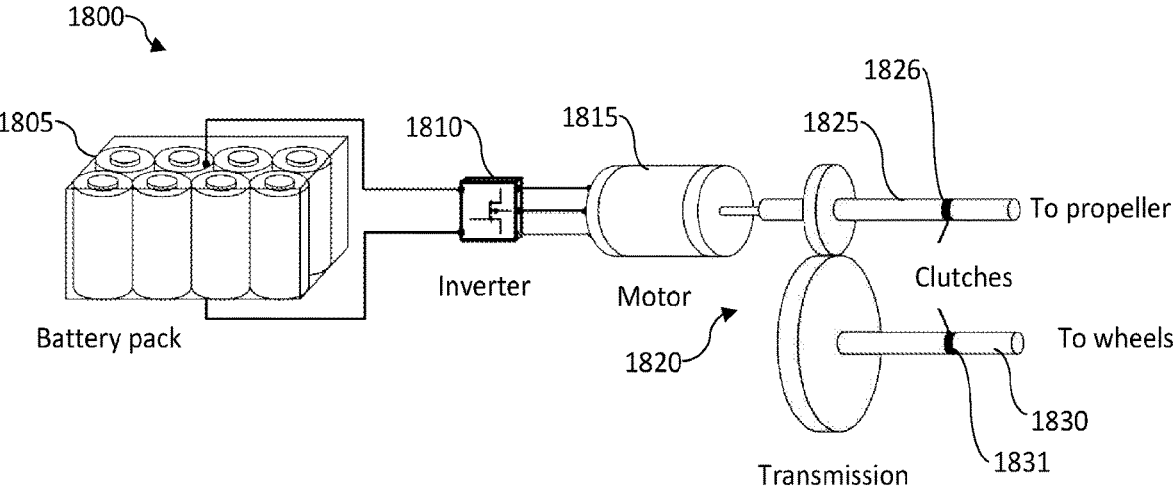
FIG. 18 depicts a configuration of a drivetrain associated with a modular UGAV, in accordance with the disclosed embodiments.

The purpose of the powertrain 1410 is to provide the driving force and auxiliary power to the UGAV 1400. FIG. 18 presents components of an exemplary, all-electric powertrain 1410, as can be used in certain embodiments. The battery pack 1805 can supply energy to the system, with the state of charge (SOC) describing the fraction of charge within the pack. An inverter 1810 regulates the power drawn from the battery pack 1805 to the motor 1815, through the duty cycle, D, which acts as an external control input. The motor 1815 can be connected to a transmission 1820 with two output shafts, shaft 1825 and shaft 1830. The first output shaft 1825 directly connects the motor to the propeller. The second output shaft 1830 connects to the wheels of the vehicle through a set of gears with gear ratio GR. Each output shaft is fitted with a clutch, clutch 1826 and clutch 1831, to engage the respective output shaft when in aerial or ground mode. The two signals to engage or disengage the clutches can be external control inputs.

Three controllers can be designed to provide the vehicle's essential motion regulation function: the ground vehicle speed controller, aerial vehicle speed controller, and aerial vehicle elevation controller. The respective controllers can comprise software modules, as illustrated in FIGS. 1-3. While the vehicle is in ground mode, the ground vehicle speed controller acts similarly to cruise control in mass production vehicles. It measures longitudinal vehicle speed as the feedback signal to calculate the required duty cycle command, dc % for the powertrain model to generate and deliver the required propulsion force to reach and maintain the target speed v★x. The controller algorithm takes the following form:

$$e_{v_x} = v_x^\star - v_x \tag{9}$$

$$dc\ \% = K_{pv}e_{v_x} + K_{iv}\int e_{v_x}dt + K_{dv}\frac{de_{v_x}}{dt}$$

where Kpv, Kiv, and Kdv are controller proportional (P), integral (I), and derivative (D) gains to be tuned empirically. This type of PID controller has been widely adopted in practice thanks to its implementational simplicity and reasonable performance. Similarly, the aerial vehicle speed controller measures the aerial vehicle speed as the feedback signal to calculate the corresponding duty cycle for the powertrain model to generate the required propeller thrust such that the desired aerial speed can be reached. The controller gains of aerial vehicle speed controller are tuned separately as well.

For the aerial vehicle, the vehicle elevation is regulated through a hierarchical controller that consists of a pitch angle controller and an altitude controller. According to the aerial vehicle dynamics, its elevation is adjusted through the change of pitch angle indirectly. Hence a two-step control architecture can be used for elevation control purposes. On the command level, a target altitude is set for the vehicle as z★. The altitude controller then measures the current altitude of the vehicle z as the feedback signal to calculate the required pitch angle, θ★. The calculated θ★ is then provided to low-level actuators as a reference value for them to make adjustments such that the actual pitch angle θ can track the required pitch angle θ★ in a timely manner. The complete formulation is written as follows:

$$e_z = z^\star - z \tag{10}$$

$$e_\theta = \theta^\star - \theta$$

$$\theta^\star = K_{pz}e_z + K_{iz}\int e_z dt + K_{dz}\frac{de_z}{dt}$$

$$\text{elevator } \% = K_{p\theta}e_\theta + K_{i\theta}\int e_\theta dt + K_{d\theta}\frac{de_\theta}{dt}$$

The steps of the design framework can be used to set up the UGAV system. For example, two design variables can be selected. The first design variable modifies the size of the powertrain's battery pack by changing the number of strings of cells in parallel, and is constrained between 1 and 10. The second design variable selects the proportional gain of the aerial velocity tracking controller, and can be constrained between 0.5 and 5 (as established empirically). Finally, dynamic and parametric connections are defined to connect the models. The dynamic connections can comprise: 1) The duty cycle and clutch commands are provided from the controller and input to the powertrain; 2) The controller's elevator pitch command is input to the aerial body model; 3) The measurements of the current altitude and velocity of the vehicle is fed into the controller; 4) The output torque from the powertrain's propeller shaft is used as an input to the propeller 5) The output force from the powertrain's wheels shaft is used as an input to the ground body model; 6) The propeller velocity is fed into the powertrain model to determine the propeller shaft velocity state; 7) The velocity of the ground body model is used to determine the velocity of the wheels, and thus the wheels shaft velocity state in the powertrain (the wheel dynamics are captured by a first-order filter); 8) The velocities of the aerial and ground body models are synchronized when switching between air and ground modes; and 9) The thrust of the propeller is input to the aerial body model.

A parametric connection relates the mass of the powertrain to the aerial and ground body models. Increasing the battery pack size proportionally increases its mass. This is reflected in the mass parameter of the aerial and ground body models. The total mass of the vehicle in each of these body models is set to be equal. Two performance outputs can be defined as the change in SOC of the battery pack and the total energy consumed, respectively, over the duration of the mission.

An exemplary, dynamic performance of the disclosed systems is provided below to outline various design features. For purposes of this example, a mission profile can include takeoff-cruise-landing with a duration of 200 seconds. The vehicle starts on the ground with an initial speed of zero. The ground vehicle speed controller can drive the speed to a target takeoff speed, at which point the aerial vehicle elevation controller and speed controller takes over control. The vehicle will then follow a constant cruise speed before it descends to the ground level again. This simple mission profile exemplifies the vehicle's transient performance.

Figure 19:
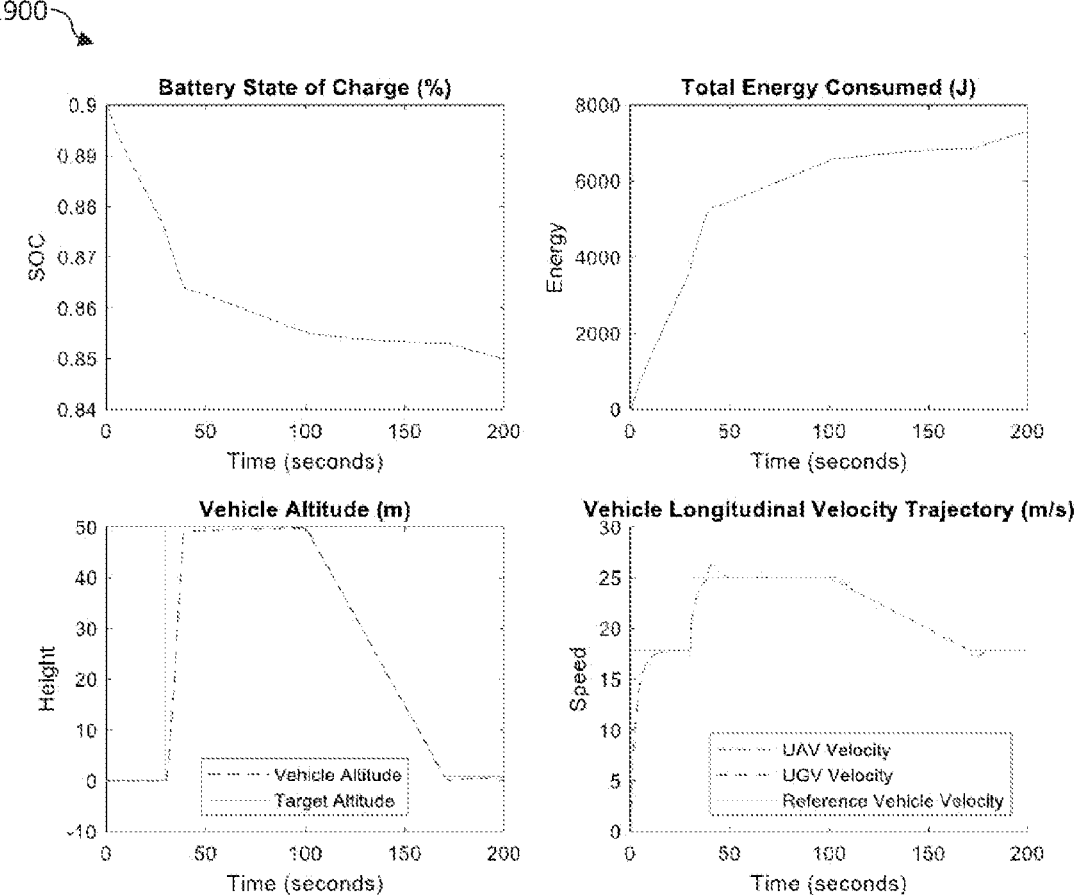
FIG. 19 depicts characteristic flight data charts, in accordance with the disclosed embodiments.

Results of such a mission are illustrated in charts 1900 provided in FIG. 19. As shown in the figure, the vehicle's altitude and velocity can track the designed mission profile accurately with a fast response. Meanwhile, the battery state of charge drops 5% during the entire profile. This corresponds to a total of 7300 J of energy consumed.

Figure 20:
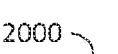
FIG. 20 depicts a table of battery data, in accordance with the disclosed embodiments.

This exemplary result is based upon a single battery pack design. As different mission profiles will require varying operational ranges, changing the number of battery cells will accommodate such needs. More battery cells will provide more energy to support long-range operation, but it will also increase the weight of the UGAV, leading to an increase in energy consumption. To quantitatively address the impacts of different energy storage requirements, a different number of battery packs can be used. Each battery pack consists of four battery cells in parallel, totaling a weight of 0.3 kg. The numerical results are summarized in Table 2000 illustrated in FIG. 20.

As the number of battery packs is increased, the consumed energy grows approximately linearly, while the SOC change becomes negligible. This provides some qualitative guidance in designing the battery pack to fit different mission profiles. Note that as the number of battery packs increases, the additional weight of the UGAV will impact the vehicle's dynamic performance such as climb speed, and even cause oscillatory behaviors in speed tracking and elevation control. Therefore, the controller needs to be tuned to meet dynamic metrics in different designs as well.

Figure 21:
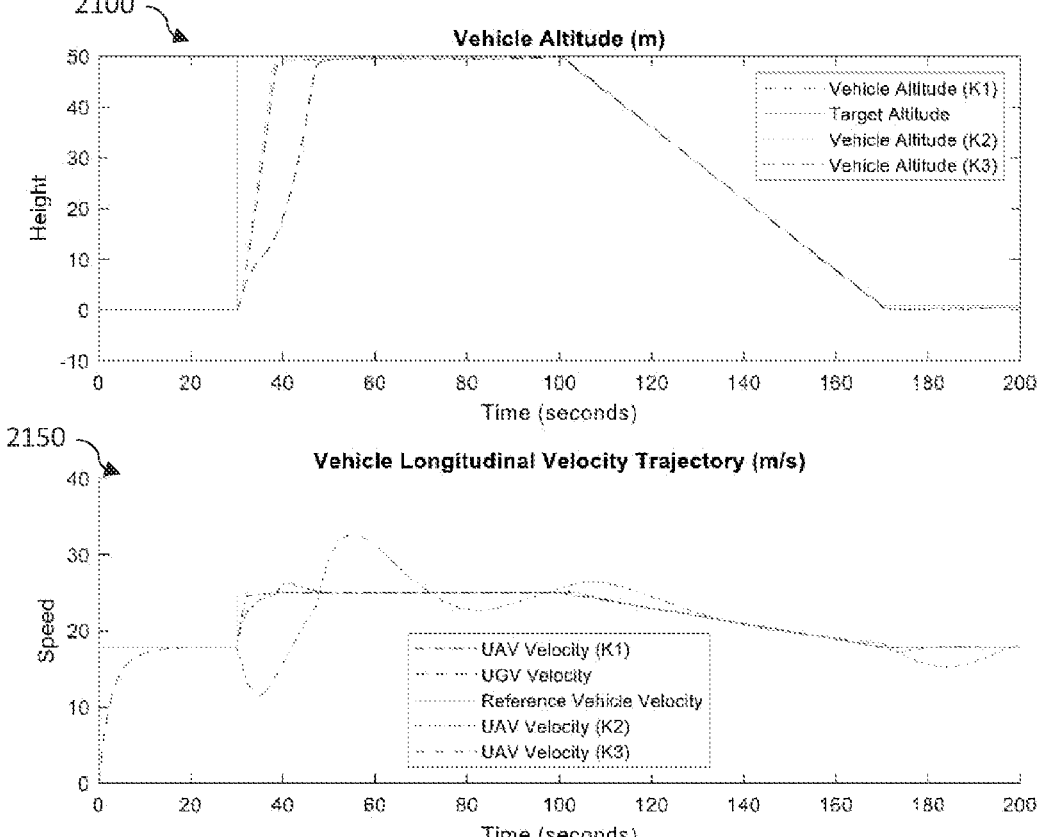
FIG. 21 depicts controller performance data charts, in accordance with the disclosed embodiments.

As an example, three different aerial vehicle speed controller designs are illustrated for the single battery pack configuration to illustrate the dynamic performance individually. In this case, K1=0.1K2=10K3, where Ki, i=1,2,3 are the proportional gains in the aerial vehicle speed controller, as introduced previously. As illustrated, different controller designs can lead to drastically different dynamical behaviors, and a proper synthesis will be essential to guarantee that desirable performance can be met for different controller designs. Associated charts 2100 and 2150 illustrate associated results in FIG. 21

The disclosed embodiments are directed to a hybrid framework for unmanned ground-aerial vehicles. The disclosed UGAV can include systems to ensure power is managed and delivered to both operating modes. A three-step framework can be used to adjust UGAV features based on desired performance outputs. In exemplary embodiments, the system can comprise five coupled, dynamic models to explore battery pack and controller parameter options for minimizing battery state of charge (SOC) and energy losses over a mission. The UGAV design can achieve fast and accurate dynamical performance with respect to its size and weight. Exemplary embodiments can be modified according to battery pack size and controller variables to provide a qualitative guidance to design the UGAV to meet specific energy and dynamic metrics for the mission profile.

Based on the foregoing, it can be appreciated that a number of embodiments, preferred and alternative, are disclosed herein. For example, in an embodiment a modular UAV system comprises a blended wing body module, at least two high speed long range wing panel modules configured to interchangeably mount to the blended wing body module, at least two low speed high endurance wing panel modules configured to interchangeably mount to the blended wing body module, a vertical tails module configured to interchangeably mount to the blended wing body module, and a vertical takeoff and landing fin module configured to interchangeably mount to the blended wing body module.

In an embodiment the UAV system further comprises at least one wing nacelle configured on each of the at least two high speed long range wing panel modules and a motor configured in each wing nacelle. In an embodiment the UAV system further comprises at least one wing nacelle configured on each of the at least two low speed high endurance wing panel modules and a motor configured in each wing nacelle. In an embodiment the UAV system further comprises a nacelle configured on the vertical takeoff and landing fin module and a motor configured in the nacelle. In an embodiment the vertical tails module further comprises two tail fins.

In an embodiment the UAV system further comprises two interfaces on the blended wing body module, wherein each of the two interfaces comprise a quick lock/release mechanism compatible with the high speed long range wing modules and the low speed high endurance wing modules.

In an embodiment the UAV system further comprises a control system housed in the blended wing body module, the control system further comprising a computer system, the computer system comprising: at least one processor and a computer-usable medium embodying computer program code, the computer-usable medium capable of communicating with the at least one processor, the computer program code comprising instructions executable by the at least one processor and configured for controlling the modular UAV system.

In an embodiment, the two interfaces further connect the control system to one of: each of the at least two high speed long range wing panel modules and each of the at least two low speed high endurance wing panel modules. In an embodiment a logic circuit is housed inside each of at least one of the high speed long range wing module, the low speed high endurance wing module, and the vertical takeoff and landing fin, wherein the logic circuit interfaces to the control system.

In an embodiment, a modular ground and aerial autonomous vehicle system comprises a blended wing body module, at least two high speed long range wing panel modules configured to interchangeably mount to the blended wing body module, at least two low speed high endurance wing panel modules configured to interchangeably mount to the blended wing body module, a vertical tails module configured to interchangeably mount to the blended wing body module, a power train, and a wheels module that may be fixed or retractable and is operably connected to the power train.

In an embodiment the modular ground and aerial autonomous vehicle system further comprises two interfaces on the blended wing body module, wherein each of the two interfaces comprise an electronic quick lock/release mechanism compatible with the high speed long range wing modules and the low speed high endurance wing modules. In an embodiment the modular ground and aerial autonomous vehicle system further comprises a propeller operably connected to the power train.

In an embodiment the power train further comprises an electric motor, a transmission, and a drive shaft connected to the transmission and configured to drive at least two wheels associated with the wheels module. In an embodiment the modular ground and aerial autonomous vehicle system further comprises at least one battery pack operably connected to the electric motor.

In an embodiment the modular ground and aerial autonomous vehicle system further comprises a control system housed in the blended wing body module, the control system further comprising a computer system, said computer system comprising at least one processor and a computer-usable medium embodying computer program code, the computer-usable medium capable of communicating with the at least one processor, the computer program code comprising instructions executable by the at least one processor and configured for controlling the ground and aerial autonomous vehicle system.

In an embodiment the modular ground and aerial autonomous vehicle system further comprises the two interfaces further connect the control system to one of the at least two high speed long range wing panel modules and the at least two low speed high endurance wing panel modules. In an embodiment a logic circuit interfaces to the control system and is housed inside each of the at least two high speed long range wing panel modules and the at least two low speed high endurance wing panel modules, wherein the logic circuit interfaces to the control system.

In an embodiment a method comprises defining mission parameters for a modular autonomous vehicle, selecting one of a high speed long range wing module and a low speed high endurance wing module according to the mission parameters, mounting the selected one of the high speed long range wing module and the low speed high endurance wing module according to the mission parameters to a blended wing body module, selecting one of a vertical tails module and a vertical takeoff and landing fin module according to the mission parameters, and mounting the selected one of the vertical tails module and the vertical takeoff and landing fin module.

In an embodiment the method comprises connecting a control system to a motor associated with one of the high speed long range wing module and the low speed high endurance wing module. In an embodiment the method further comprises providing power to the motor associated with the selected one of the high speed long range wing module and the low speed high endurance wing module according to the mission parameters.

It will be appreciated that variations of the above-disclosed and other features and functions, or alternatives thereof, may be desirably combined into many other different systems or applications. Also, it should be appreciated that various presently unforeseen or unanticipated alternatives, modifications, variations or improvements therein may be subsequently made by those skilled in the art which are also intended to be encompassed by the following claims.

What is claimed is:

1. A modular UAV system comprising:
a blended wing body module;
at least two first wing panel modules configured to interchangeably mount to the blended wing body module, the at least two first wing panel modules comprising symmetric blended wing panels, comprising Eppler 171 wing root airfoils, blended with Eppler 182 wing tip airfoils;
at least two second wing panel modules configured to interchangeably mount to the blended wing body module, the at least two second wing panel modules comprising symmetric blended wing panels, comprising Eppler 171 wing root airfoils, blended with Eppler 330 wing tip airfoils wherein a root chord of the at least two first wing panel modules and a root chord of the at least two second wing panel modules is the same;
a vertical tails module configured to interchangeably mount to the blended wing body module, with a vertical tail airfoil comprising an NACA 0006 vertical tail airfoil; and
a vertical takeoff and landing fin module configured to interchangeably mount to the blended wing body module, with a vertical takeoff and landing airfoil comprising an NACA 0010 vertical takeoff and landing airfoil.

2. The modular UAV system of claim 1 further comprising:
at least one wing nacelle configured on an inboard region of each of the at least two first wing panel modules; and
a motor configured in each wing nacelle.

3. The modular UAV system of claim 1 further comprising:
at least one wing nacelle configured on an inboard region of each of the at least two second wing panel modules; and
a motor configured in each wing nacelle.

4. The modular UAV system of claim 1 further comprising:
a nacelle configured on the vertical takeoff and landing fin module; and
a motor configured in the nacelle.

5. The modular UAV system of claim 1 wherein the vertical tails module further comprises:
two tail fins.

6. The modular UAV system of claim 1 further comprising:
two interfaces on the blended wing body module, wherein each of the two interfaces comprise a quick lock/release mechanism compatible with the first wing panel modules and the second wing panel modules.

7. The modular UAV system of claim 6 further comprising:
a control system housed in the blended wing body module, the control system further comprising a computer system, the computer system comprising:
at least one processor; and
a computer-usable medium embodying computer program code, the computer-usable medium capable of communicating with the at least one processor, the computer program code comprising instructions executable by the at least one processor and configured for:
controlling the modular UAV system.

8. The modular UAV system of claim 7 wherein the two interfaces further connect the control system to one of:
each of the at least two first wing panel modules; and
each of the at least two second wing panel modules.

9. The modular UAV system of claim 7 wherein a logic circuit is housed inside each of at least one of:
the first wing panel module;
the second wing panel module; and
the vertical takeoff and landing fin;
wherein a logic circuit interfaces to the control system.

* * * * *